(12) United States Patent
Patel

(10) Patent No.: US 6,247,897 B1
(45) Date of Patent: Jun. 19, 2001

(54) VANE SYSTEM

(75) Inventor: Dinesh Patel, 503 Mansarovar, Mount Pleasant Road, Bombay, 400 006 (IN)

(73) Assignee: Dinesh Patel, Pune (IN)

( * ) Notice: Subject to any disclaimer, the term of this patent is extended or adjusted under 35 U.S.C. 154(b) by 0 days.

(21) Appl. No.: 09/330,387

(22) Filed: Jun. 11, 1999

(30) Foreign Application Priority Data

Jun. 15, 1998 (ZA) ................................................. 98/5172

(51) Int. Cl.$^7$ ...................................................... B63H 1/26
(52) U.S. Cl. ............................... 416/197 R; 416/213 A; 416/220 A; 416/234; 416/237; 416/241 A; 416/243; 416/244 B
(58) Field of Search .................. 416/197 R, 197 A, 416/197 B, 213 A, 220 A, 234, 237, 241 R, 241 A, 243, 244 B

(56) References Cited

U.S. PATENT DOCUMENTS

| | | | | |
|---|---|---|---|---|
| 471,817 | * | 3/1892 | Green ............................... | 416/197 A |
| 755,426 | * | 3/1904 | Wood .................................... | 416/243 |
| 2,000,720 | * | 5/1935 | Snyder et al. ........................ | 416/243 |
| 2,024,700 | * | 12/1935 | Millar .................................... | 416/234 |
| 2,212,041 | * | 8/1940 | Pfautsch ............................... | 416/243 |
| 2,240,597 | * | 5/1941 | Whitefield ............................ | 416/243 |
| 2,252,788 | | 8/1941 | Sparr ...................................... | 170/10 |
| 3,782,857 | | 1/1974 | Svilans ................................. | 416/236 |

FOREIGN PATENT DOCUMENTS

| | | | |
|---|---|---|---|
| 27 17 379 | 10/1978 | (DE) | ................................. F03D/3/02 |
| 31 18648 A1 | 2/1983 | (DE) | ................................. F15D/1/10 |
| 36 13434 A1 | 11/1987 | (DE) | ................................. F03D/3/04 |
| 382724 | 2/1908 | (FR) | . |
| 2 549 761 | 2/1985 | (FR) | ............................. B24B/47/14 |
| 2 199 379A | 12/1987 | (GB) | ............................. F01D/5/14 |
| 2003831 | 11/1993 | (RU) | ............................. F03B/17/06 |

* cited by examiner

*Primary Examiner*—Edward K. Look
*Assistant Examiner*—Ninh Nguyen
(74) *Attorney, Agent, or Firm*—Sierra Patent Group, Ltd.

(57) ABSTRACT

An improved vane system comprising of two or more vanes being part of a spherical section related to a hub characterized in that an operative concave surface of the vane being part of the spherical section. An operative convex surface of the vane being part of a spherical section and the vane having an operative anterior lateral border with an operative posterior lateral border having a free superior tip and an inferior edge related to the hub by which the vane is angularly displaced around an axis being parallel to the velocity and the drift of the fluid.

30 Claims, 25 Drawing Sheets

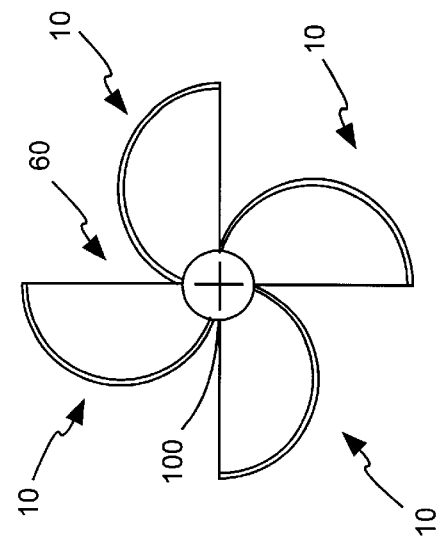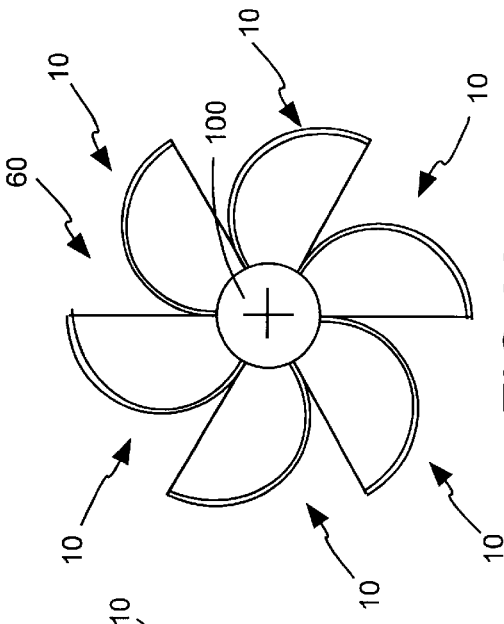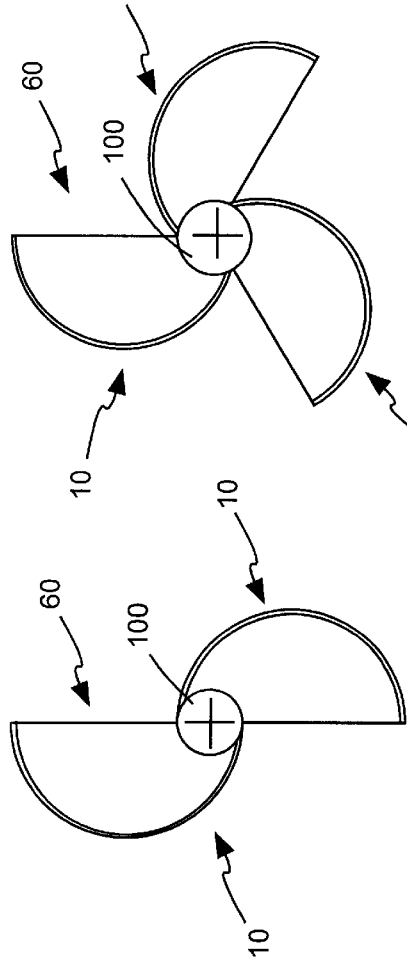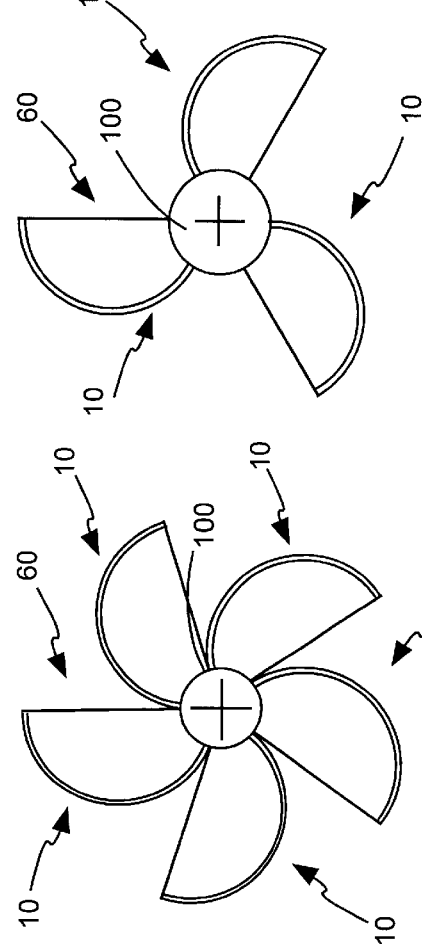

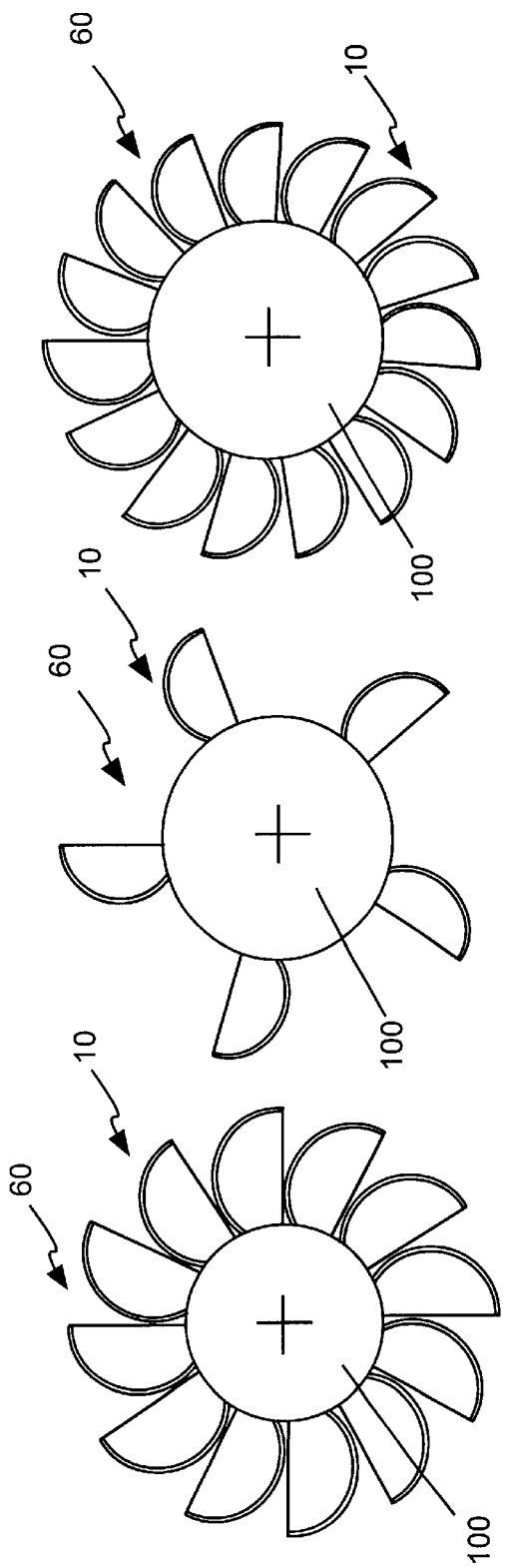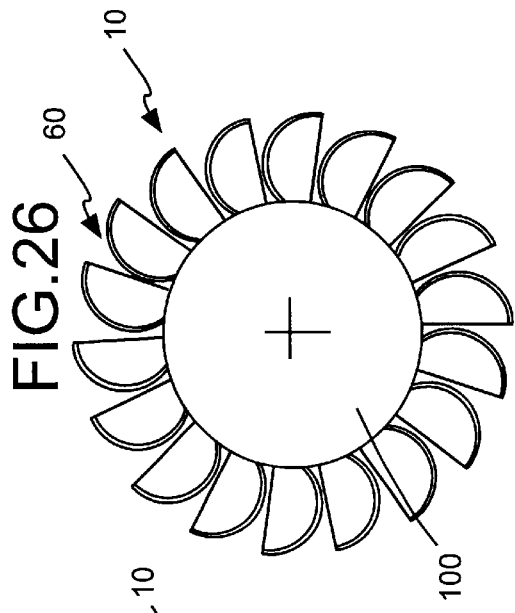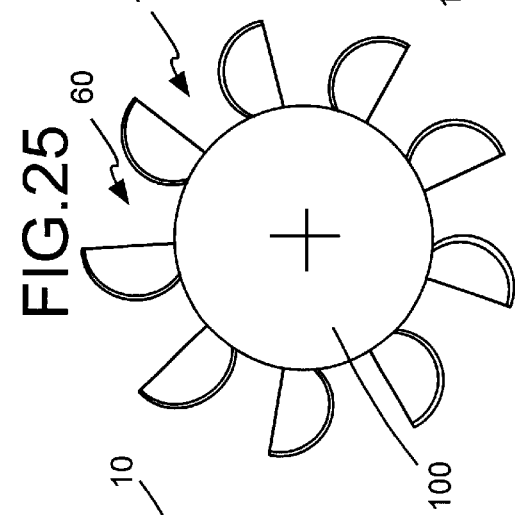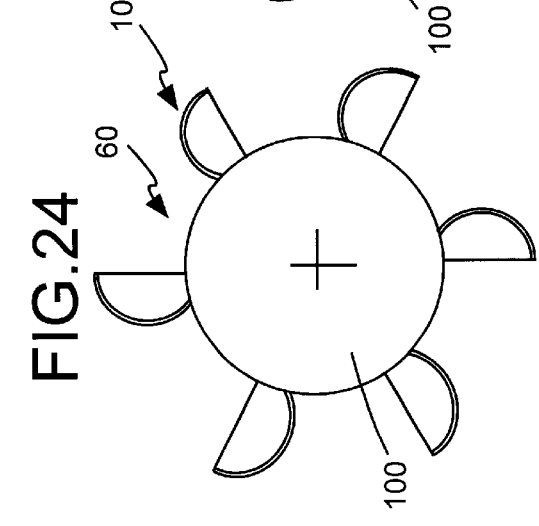

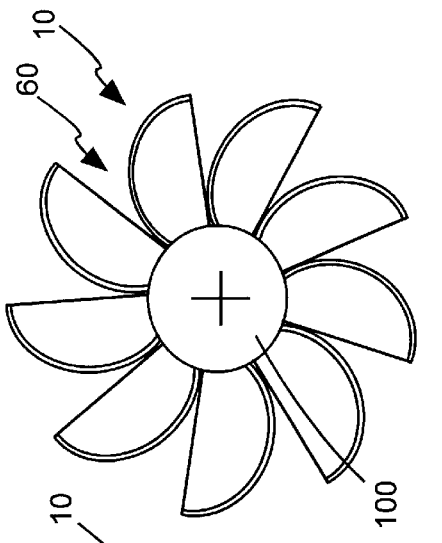
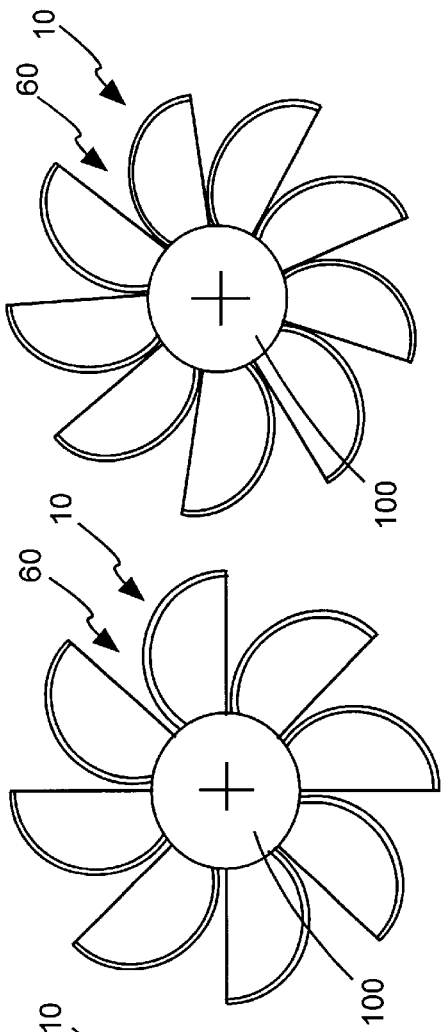
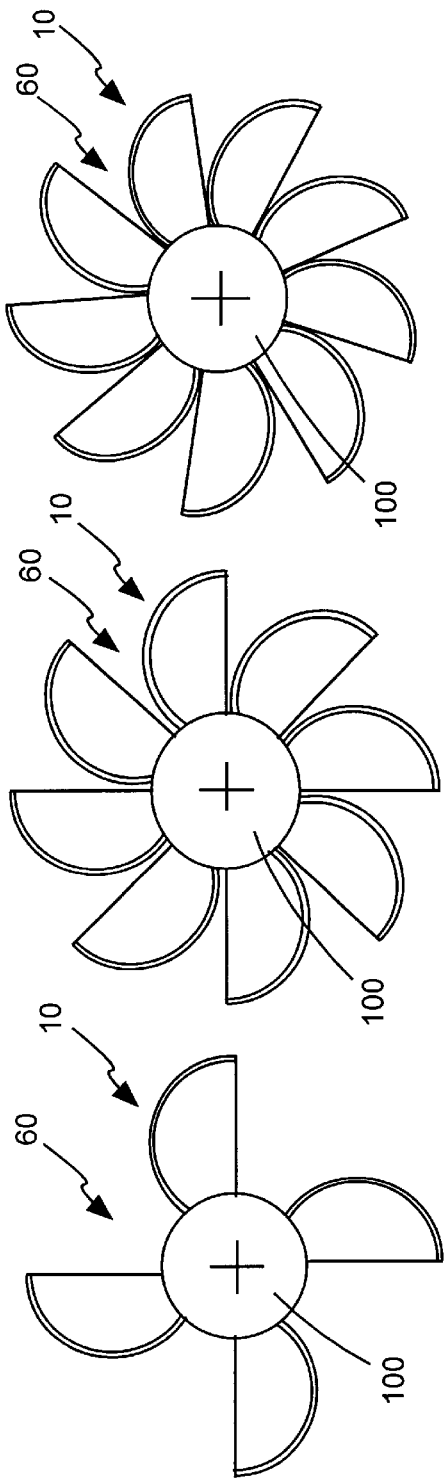
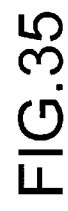
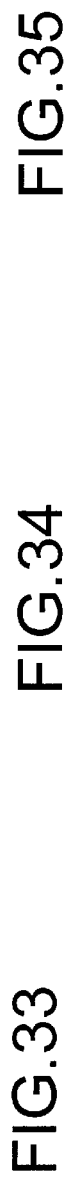

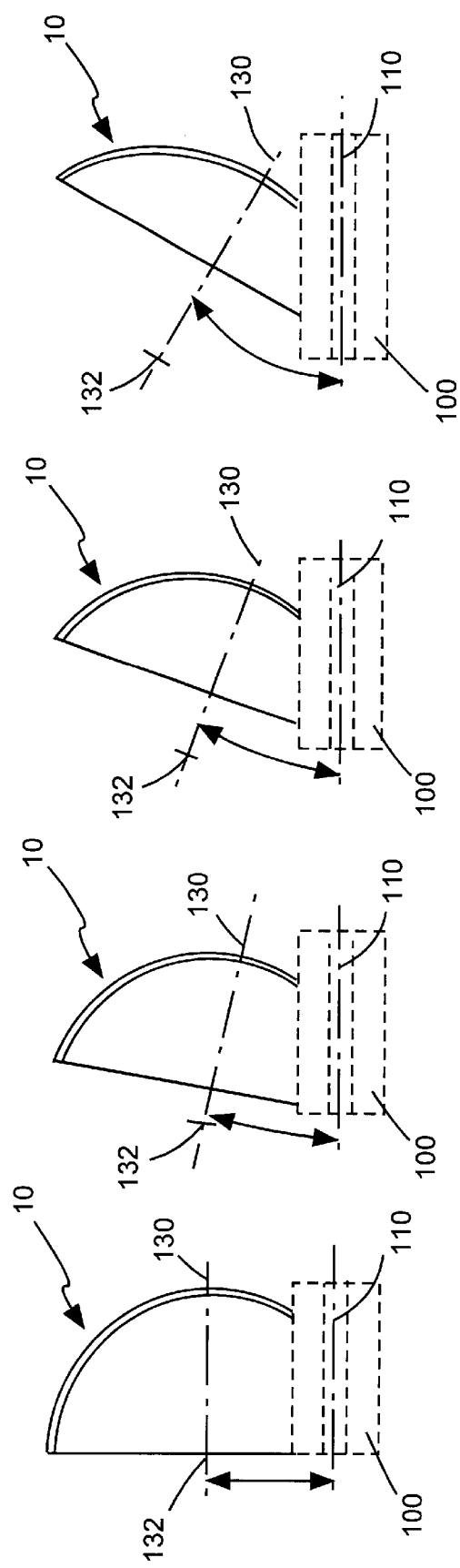

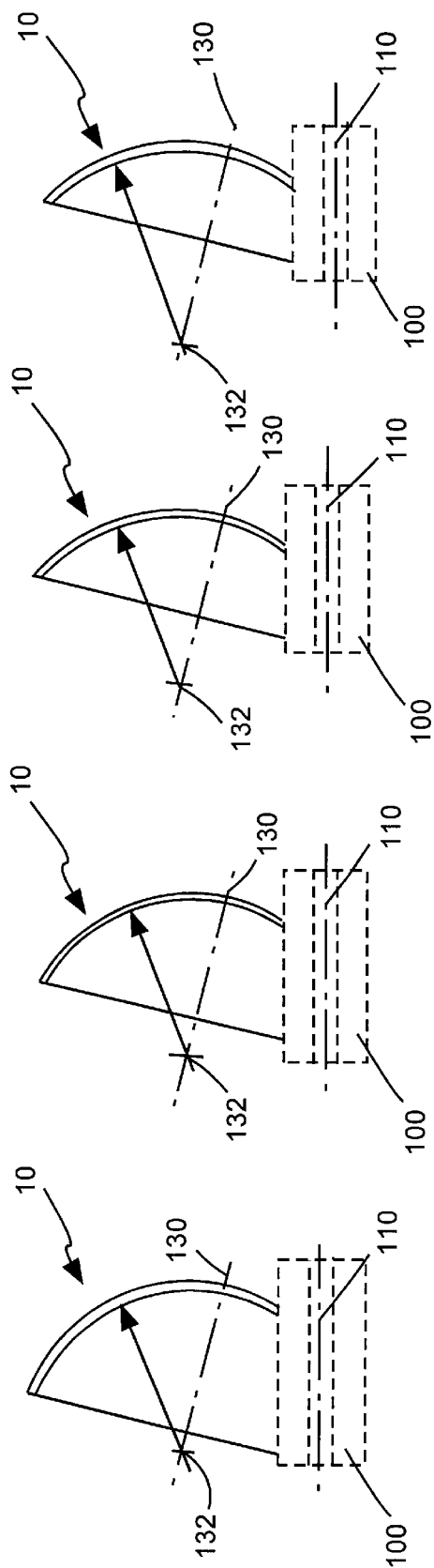

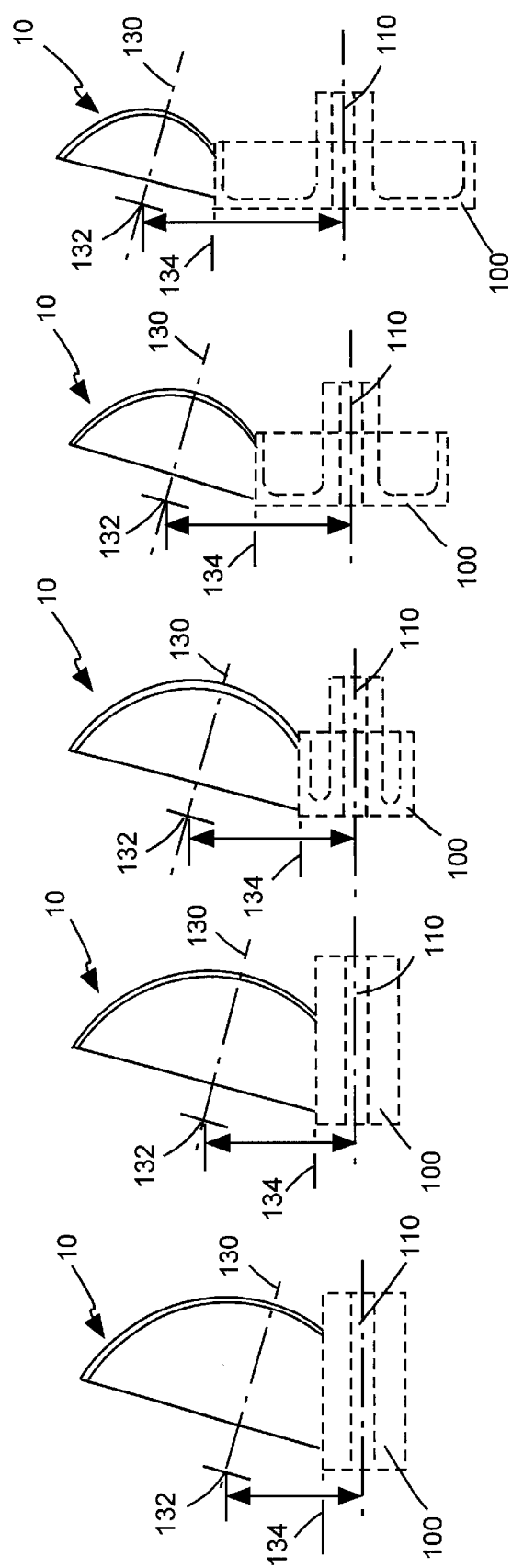

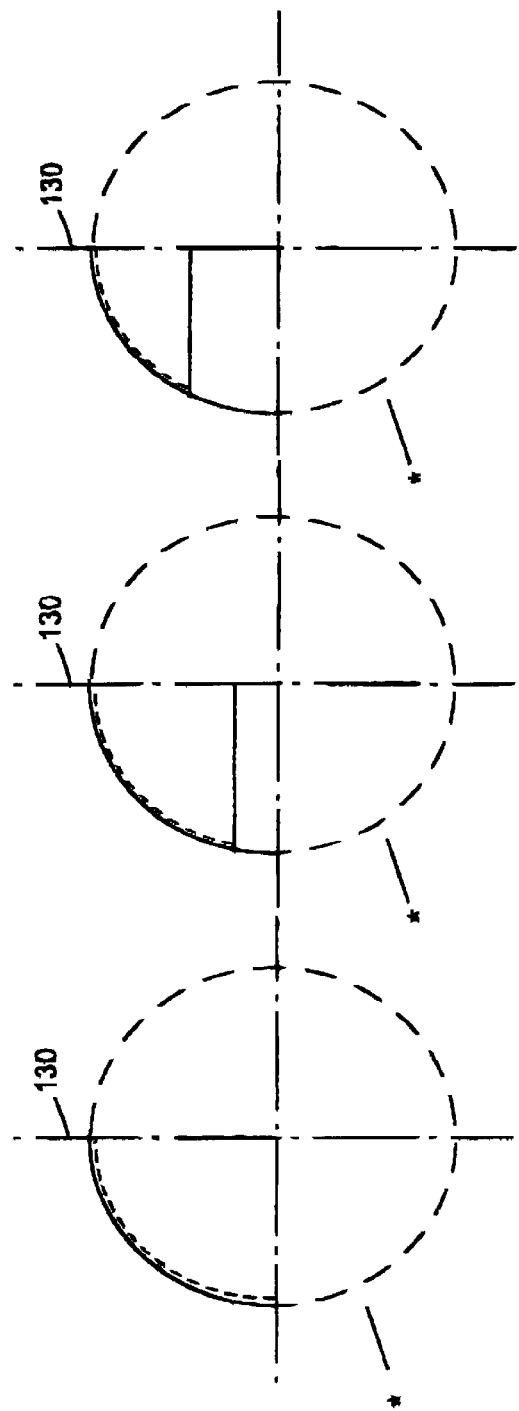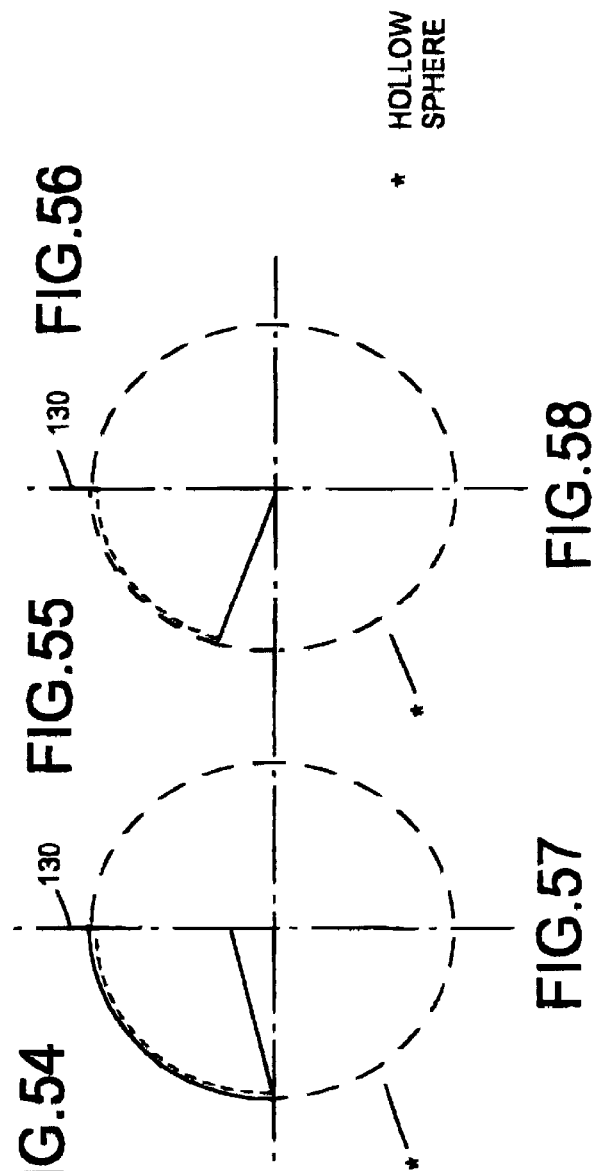
FIG.54 FIG.55 FIG.56 FIG.57 FIG.58
* HOLLOW SPHERE

VANE SYSTEM

For the purpose of this specification the term 'vane' includes a blade or a vane for devices such as fans of all types of description, propellers, turbines, generators, impellers and in fact any device or equipment which includes a vane or a blade element by which fluid may be driven, dissipated or diffused or by which fluid may drive a rotatable head or by which the device or equipment may itself be driven on land, water or air.

Conventional Vanes are flat sections which may be curved or profiled or casted or moulded in curved or profiled sections to induce propulsion. The conventional vanes generate limited fluid velocity and are required to rotate through circles of relative large diameters to effectively disperse fluid. In the conventional vanes only one surface is operative for cutting, 'collecting' and 'throwing' of the fluid. These vanes, particularly in the configuration as fan blades, need a free inlet and outlet for air and cannot work effectively if there is resistance. Hemispherical vanes have been used in anemometers (wind gauges) and in some turbines and also in pelton wheel applications. These vane work in a manner that only one vane at a time takes full impact of the fluid velocity and their operating axis is perpendicular to the velocity of the fluid. Again only one surface, typically, the concave surface is operative. Hitherto the hemispherical vanes have not been used for propulsion of air or fluid.

U.S Pat. No. 2,252,788 [spar N. A] discloses a cup vane for rotors used for generating power (reactive rotors). The vanes disclosed in this invention are also not suitable for propulsion. Also the design of the vane system requires extending the inner end of each vane to extend past the axis of rotation to enable formation of a connecting passage between the off and the on faces of adjacent vanes. The construction of these passages in cup-type calotte vanes proposed in the U.S. Patent is unpractical and very complicated.

This invention proposes vane system in which improved fluid dynamics is achieved, lower energy is consumed by the equipment or device, turbulence is minimized and the size of the equipment or of an assembly in which a plurality of vanes are fitted is made smaller. Consequently it is believed that there will also be reduction in the cost of the equipment and in running costs.

In accordance with this invention there is AN IMPROVED VANE SYSTEM comprising of two or more vanes being part of a spherical section related to a hub, characterised in that:
  an operative concave surface being part of a spherical section;
  an operative convex surface being part of a spherical section;
  and the said vane having
  an operative anterior lateral border with
  an operative posterior lateral border having
  a free superior tip and
  an inferior edge related to a hub by which the vane is angularly displaced
  around an axis.

In accordance with one embodiment of the invention the concave surface is the operative leading surface when the vane is angularly displaced in which case the vane body is an element of a propulsion system or an impeller system.

Alternatively, in accordance with another embodiment of the invention the concave surface is the operative trailing surface when the vane body is angularly displaced in which case the vane body is an element of a turbine or windmill.

In accordance with one embodiment of this invention the leading and trailing surfaces are sections of concentric hollow spheres and the body is uniformly thick.

In accordance with another embodiment of this invention the leading and trailing surfaces are sections of non concentric hollow spheres and the body is not uniformly thick such that the body of the vane is thinner at the free superior tip and thicker at the inferior edge related to the hub or vice versa.

In accordance with a preferred embodiment of this invention the superior tip is defined by the meeting of the operative anterior lateral and the operative posterior lateral borders.

In accordance with a preferred embodiment of the invention the vane body is a section of one fourth or less than on fourth of a hollow sphere, this geometry allows the vane body to be complementary to the adjacent vane body when the vane bodies are mounted around a hub, to enable the system to perform optimally in a dynamic fluid state.

In accordance with one embodiment of the invention the vane is securely fitted to a hub on which it is angularly displaced. In the securely fitted embodiment the inferior edge of the vane body is profiled to contour a hub upon which it is bonded by a known bonding method such as welding. In accordance with another securely fitted embodiment of this invention, the vane body is provided at its inferior edge with apertures through which bolts, screws or other fixture means can pass through for securely fitting the vane body to the hub.

In accordance with another embodiment of the invention the vane body extends from a hub.

In one extending embodiment the vane may be formed from sheet metal, moulded, casted, extruded, sculpted, spark eroded, turned or otherwise made in one piece with the hub in which case the vane may be integral with the hub.

In another extending embodiment the vane body is mounted in a groove or slot complimentary with the inferior edge of the vane body and integrated with the hub by a bonding process.

The invention extends, in accordance with another aspect of this invention to a vane and hub assembly comprising a plurality of vanes in accordance with the first aspect of this invention; and
  A hub to which the plurality of vanes are coupled.

The plurality of vanes may be similar in shape and size to each other or may be different.

The vanes may be integral or securely fitted to the hub.

Typically the vanes and hub assembly may comprise two vane on a single hub or as many as 36 to 48 vanes.

The hub may be cylindrical or may be profiled on its outer surface to be complimentary to the anterior surface of the vanes near the inferior edge of the vanes.

In the case of securely fitted vane and hub assemblies, the hub may be provided with grooves or slots complimentary to the inferior edge of the vanes. Flanges may be provided on the surface of the hub to provide main or additional support to the vanes in its mounted configuration on the hub. The flange may also be complimentary to the inferior edge and/or the posterior surface of the vanes.

The vanes may be positioned relative to the hub so that the axis of the vanes are parallel or inclined to the axis of the hub. Further the axis of the vanes may be aligned with or laterally displaced from the vertical plane containing the axis of the hub. Effectively the axis of the vanes may define a plane perpendicular or inclined to the plane containing the axis of the hub. Theoretically the inclination of the two axes may be as much as 80 degree forward or backward, but operationally an inclination between 15 to 60 degrees may be provided.

The effective centres of the hollow spheres of which the surfaces of the vane are sections may define a circle of predetermined radius which may vary depending upon the application of the vane and hub assembly. For example, operatively backward inclination and large radii cause higher velocities of fluid.

The hub diameters may also be varied to suit the application of the device.

In addition to slots or grooves provided on the hub, the hub may be notched to improve integration of the vane and the hub and achieve optimum fluid dynamics.

The vanes and hub may be of fabric, metal, wood, ceramic or of a synthetic polymeric material or a combination of all of the above.

The invention will now be described with reference to the accompanying drawings in which.

Figure 10:
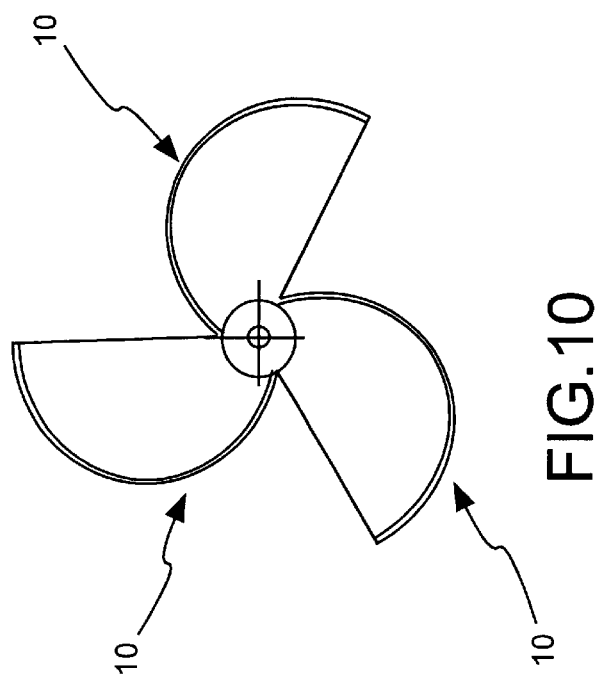
Figure 10A:
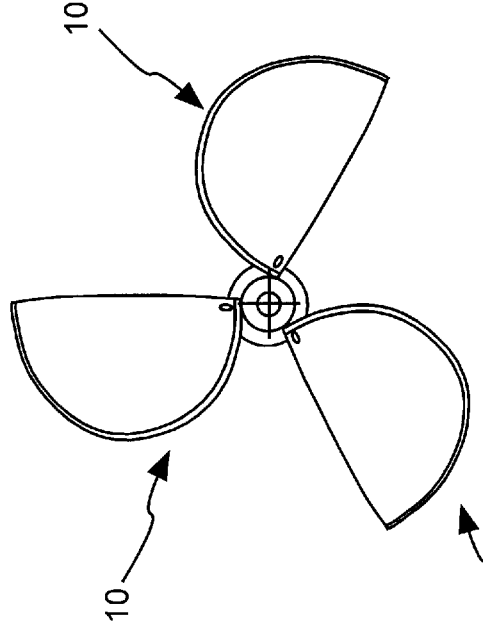

FIGS. 10AD, 11AD, 12AD and 13AD represent respectively the front, right elevation, isometric view and bottom view of another vane and hub assembly in accordance with this invention.

Figure 16:
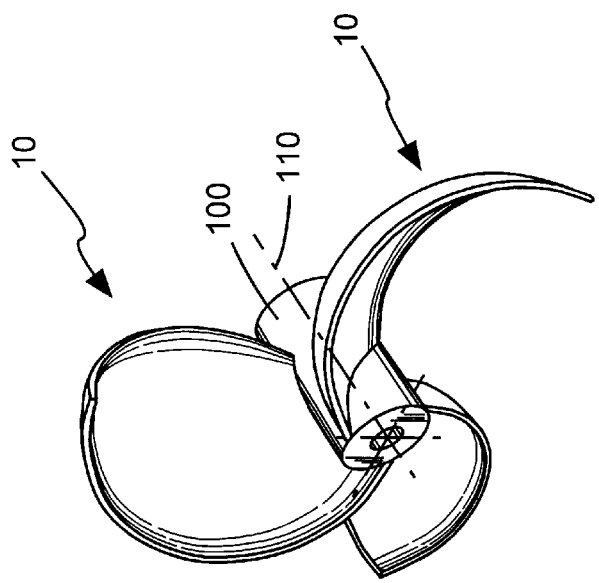
Figure 15:
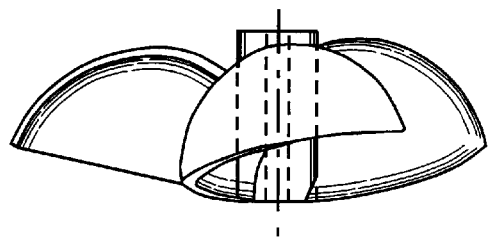
Figure 14:
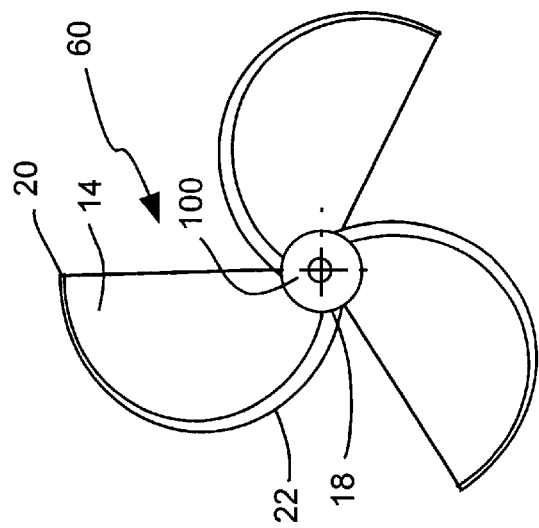
Figure 37:
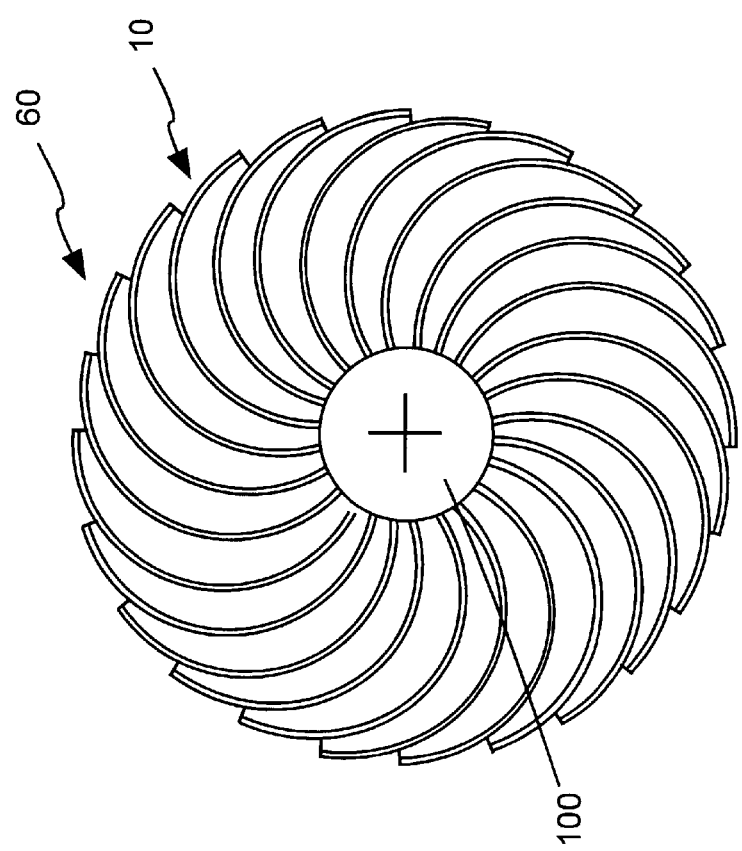
Figure 36:
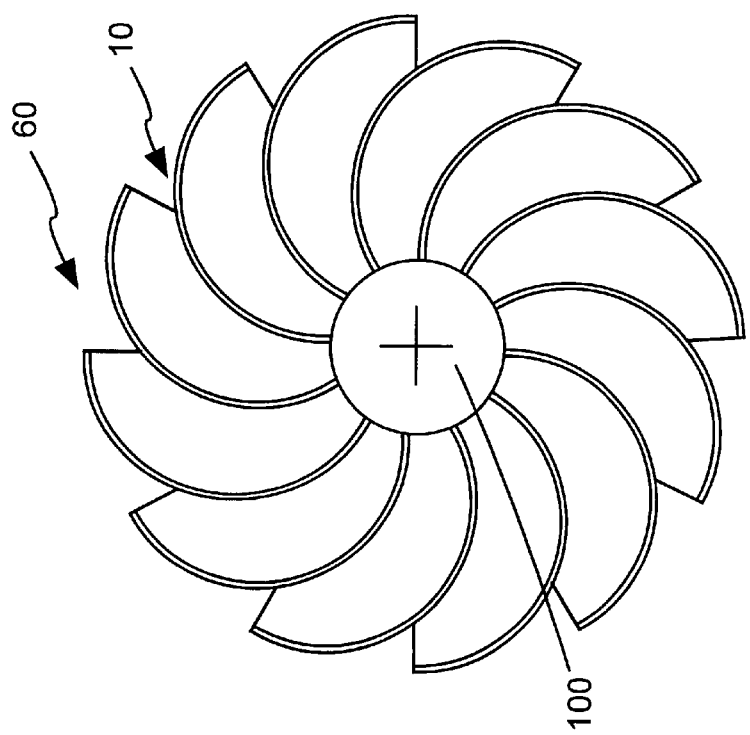
Figure 39:
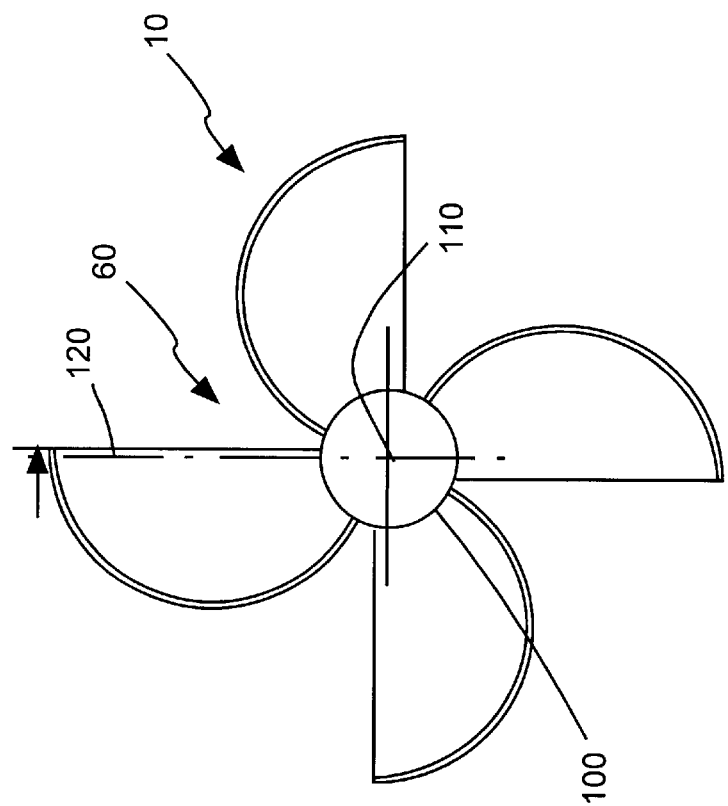
Figure 38:
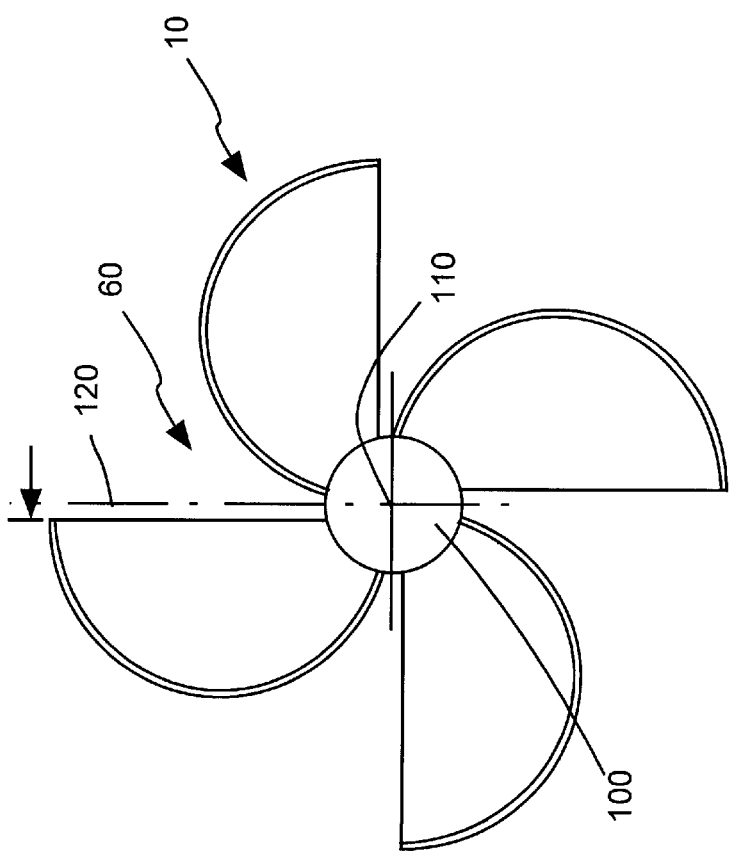

FIGS. 14 to 16 represent respectively the front, right elevation and isometric view of yet another vane and hub assembly in accordance with this invention;

FIGS. 18 to 37 represent different vane and hub assemblies in accordance with this invention;

FIGS. 38 and 39 represent two examples of lateral displacement of the axis of vane assembly with reference to the plane containing the axis of the hub;

FIGS. 40A to 40D represent examples of vane to hub attachment in which the axis of the vane is parallel to or inclined with reference to the axis of the hub;

FIGS. 41A to 41D represent examples of vanes being section of spheres having different radii coupled to a hub;

FIGS. 42A to 42E represent vanes of different sizes coupled to hubs of different diameters.

Figure 43:
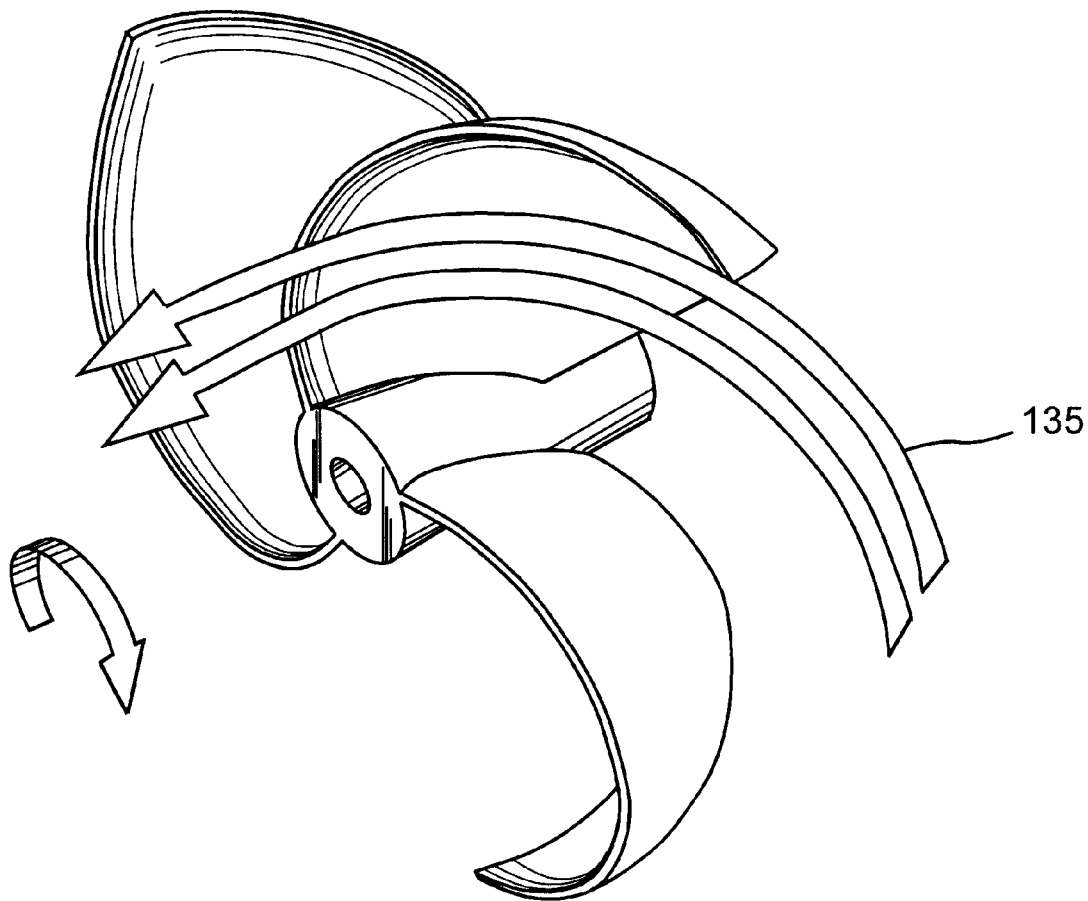

FIG. 43 represents a typical embodiment of a set of vanes extending from a hub for use in propulsion.

Figure 44:
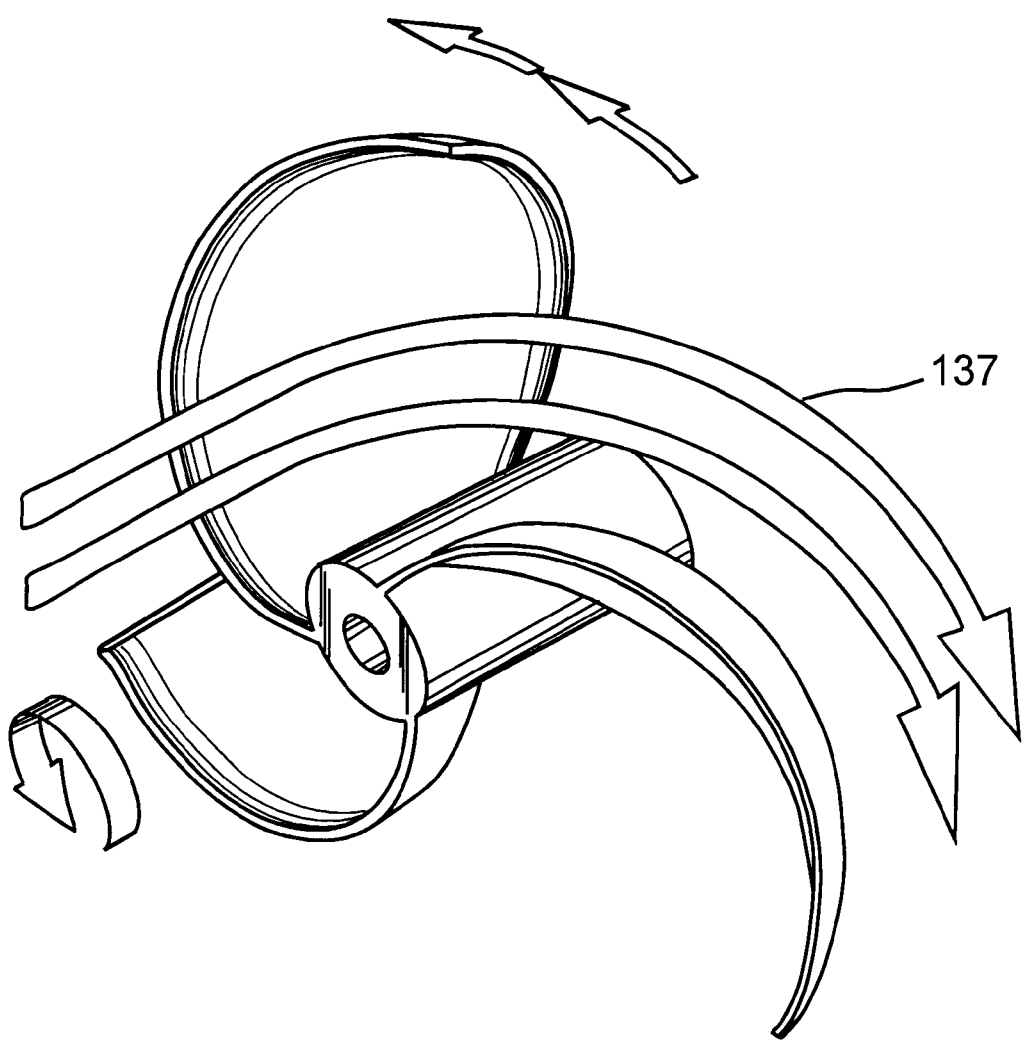

FIG. 44 represents a typical embodiment of a set of vanes extending from a hub for use in impelling.

Figure 45:
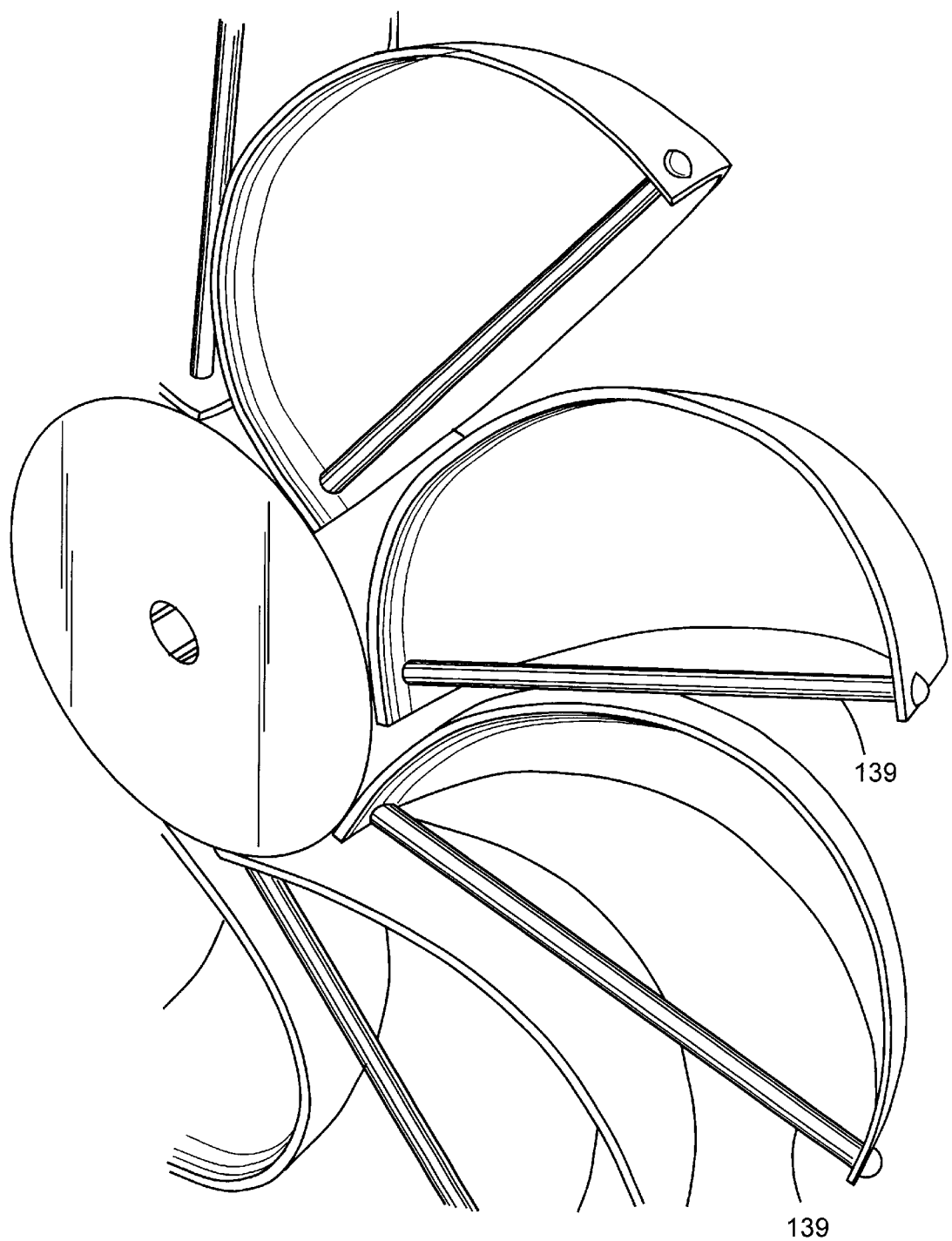
Figure 49:
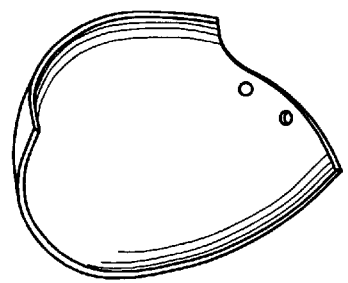
Figure 53:
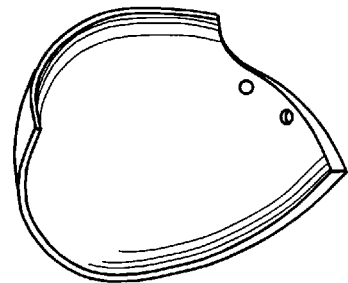
Figure 48:
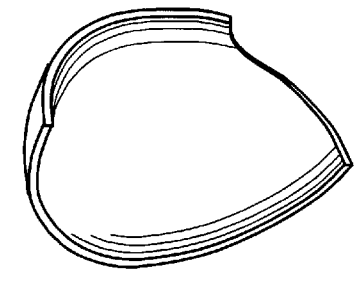
Figure 52:
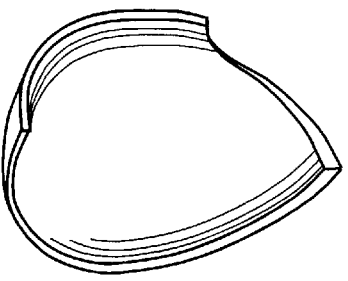
Figure 47:
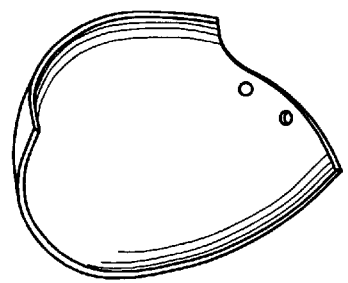
Figure 51:
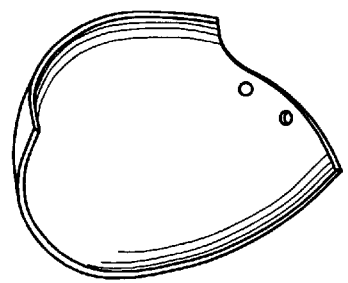
Figure 46:
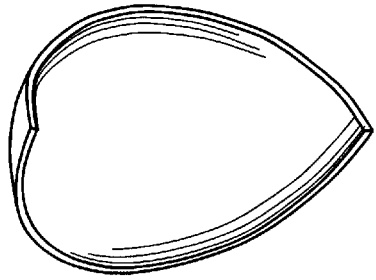
Figure 50:
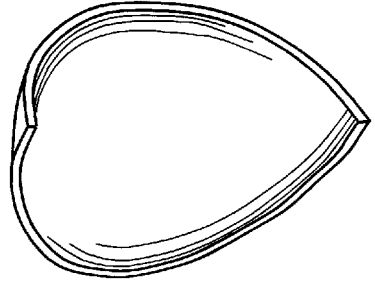

FIG. 45 shows a bar or a tube (depicted by 139) securely fixed to the hub at one end and the tip of the vane at the other end to provide additional strength and support.

FIGS. 46 to 53 represent eight embodiments of vanes in accordance with this invention FIGS. 54 to 58 show the preferred imbodiment of the vane body where the vane body is a section of one fourth or less than one fourth of a hollow sphere.

Referring to the drawings, a novel vane, generally indicated by the numeral 10 (as particularly indicated in FIGS. 46 to 53), comprises a body defined by an operative concave surface 14 being part of a spherical section; an operative convex surface 16 being part of a spherical section; an operative anterior lateral border 22; an operative posterior lateral border 24; a free superior tip 20; and an inferior edge 18 related to a hub 100 by which the vane 10 is angularly displaced around an axis.

In accordance with one embodiment of the invention the concave surface 14 is the operative leading surface when the vane 10 is angularly displaced in which case the vane body 12 is an element of the propulsion system or an impeller system.

Alternatively, in accordance with another embodiment of the invention the concave surface 14 is the operative trailing surface when the vane body 12 is angularly displaced in which case the vane body 12 is an element of a turbine.

In accordance with one embodiment of this invention the leading and trailing surfaces are sections of concentric hollow spheres and the vane body 12 is uniformly thick.

In accordance with another embodiment of this invention the leading and trailing surfaces are sections of non concentric hollow spheres and the body is not uniformly thick such that the body of the vane 10 is thinner at the free superior tip 20 and thicker at the inferior edge 18 related to the hub 100. This embodiment is particularly seen in FIG. 14 to 16 of the drawings.

In accordance with a preferred embodiment of this invention the superior tip 20 is defined by the meeting of the operative anterior lateral and the operative posterior lateral borders 22 and 24 respectively.

Figure 2:
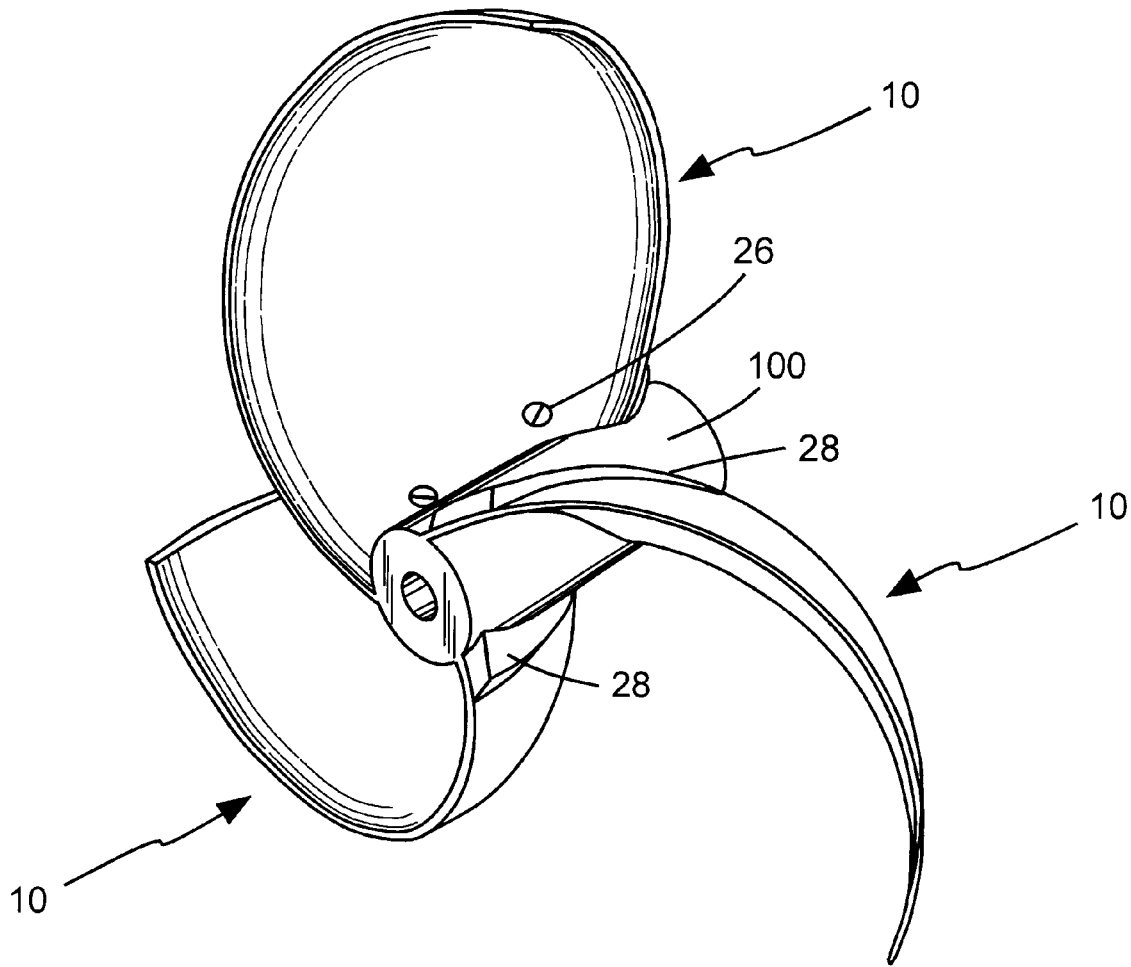
FIG. 2 represents another typical embodiment of vanes in accordance with this invention mounted on a hub.
Figure 3:
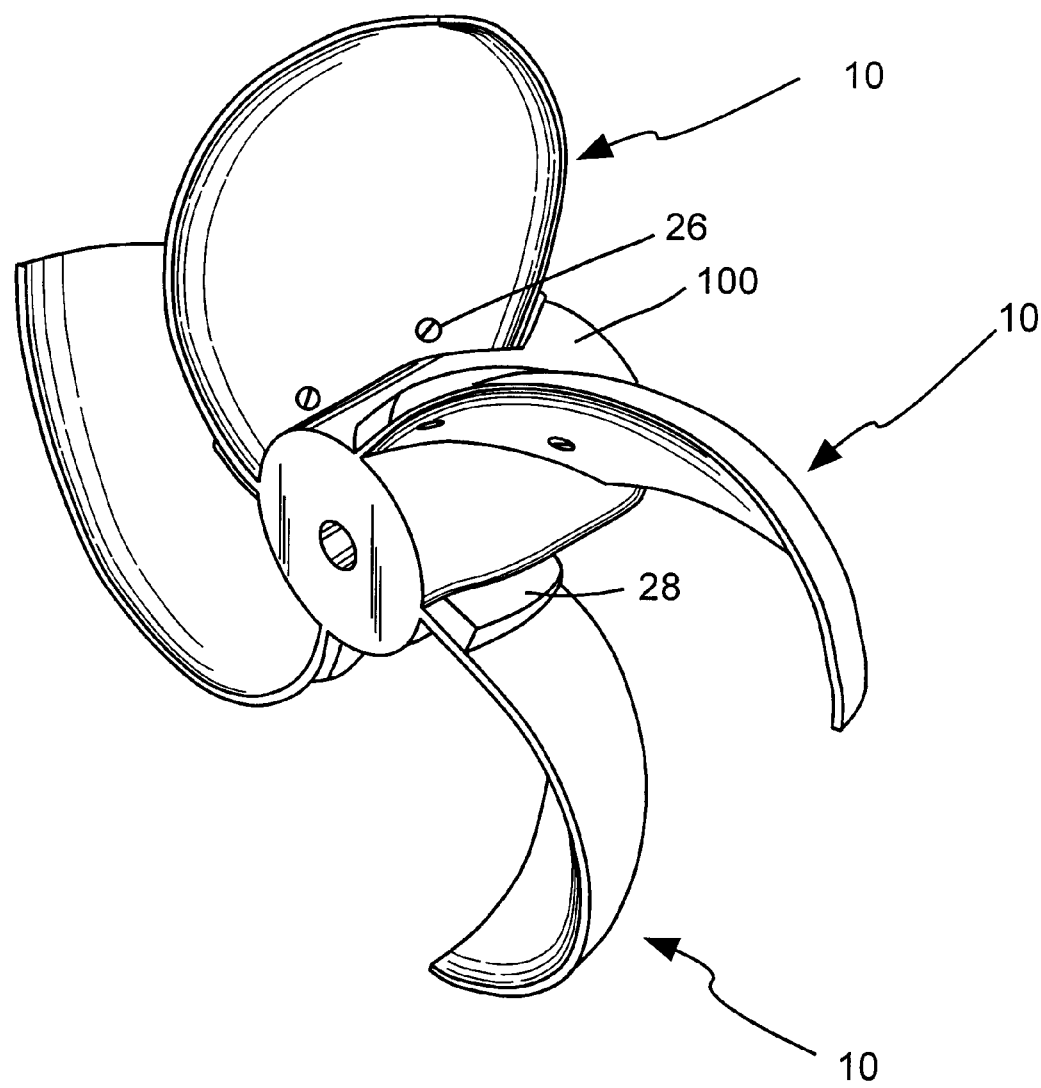
FIG. 3 represents another typical embodiment of vanes in accordance with this invention mounted on a hub.
Figure 4:
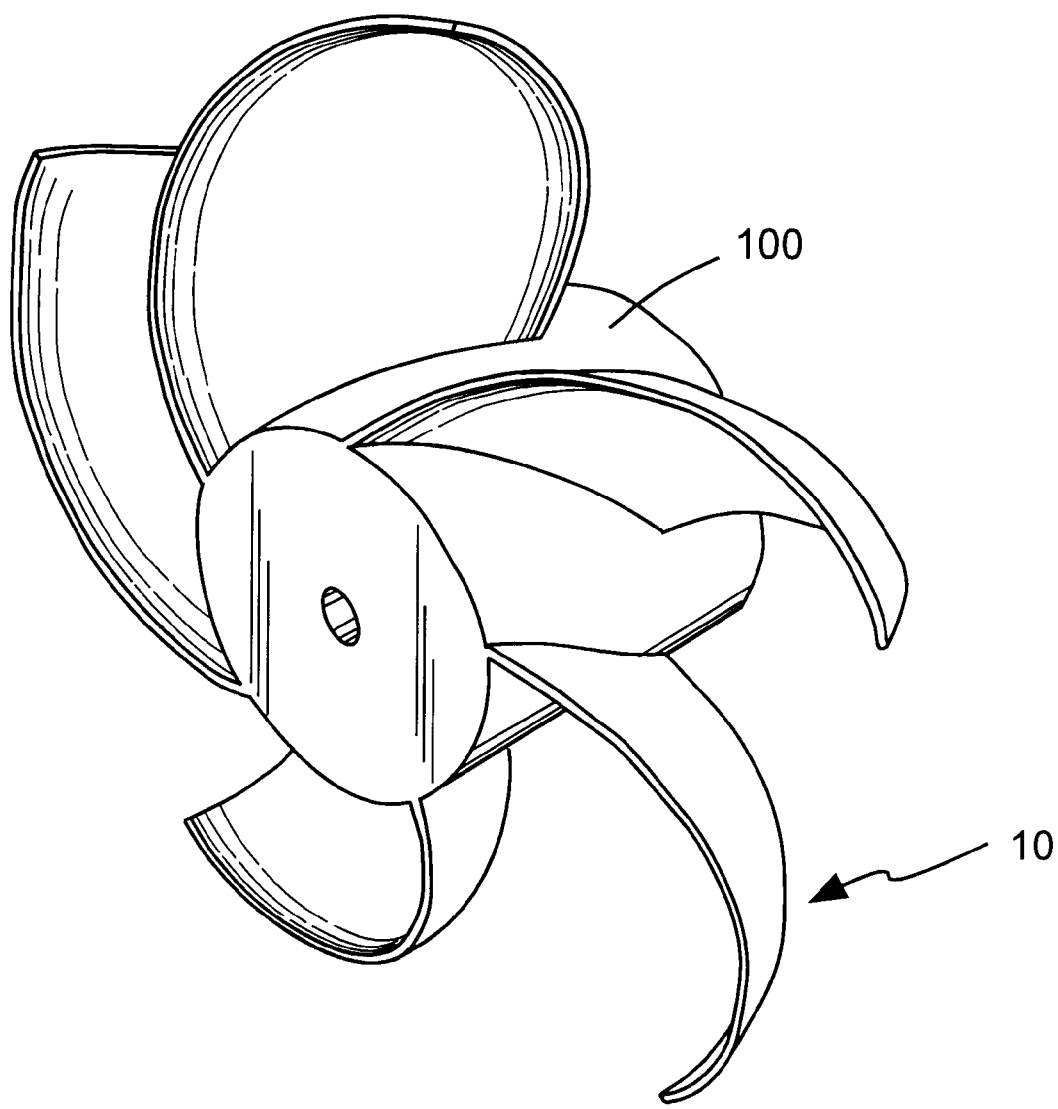
FIG. 4 represents another typical embodiment of 5 vanes in accordance with this invention coupled to a hub.

In accordance with one embodiment of the invention the vane 10 is securely fitted to a hub 100 on which it is angularly displaced. In the securely fitted embodiment the inferior edge 18 of the vane body 12 is profiled to contour a hub 100 upon which it is bonded by a known bonding method such as welding. In accordance with another securely fitted embodiment of this invention, the vane body 12 is provided at its inferior edge with apertures through which bolts, screws or other fixture means 26 can pass through for securely fitting the vane body 12 to the hub 100 as particularly seen in FIG. 2 of the drawings.

Figure 1:
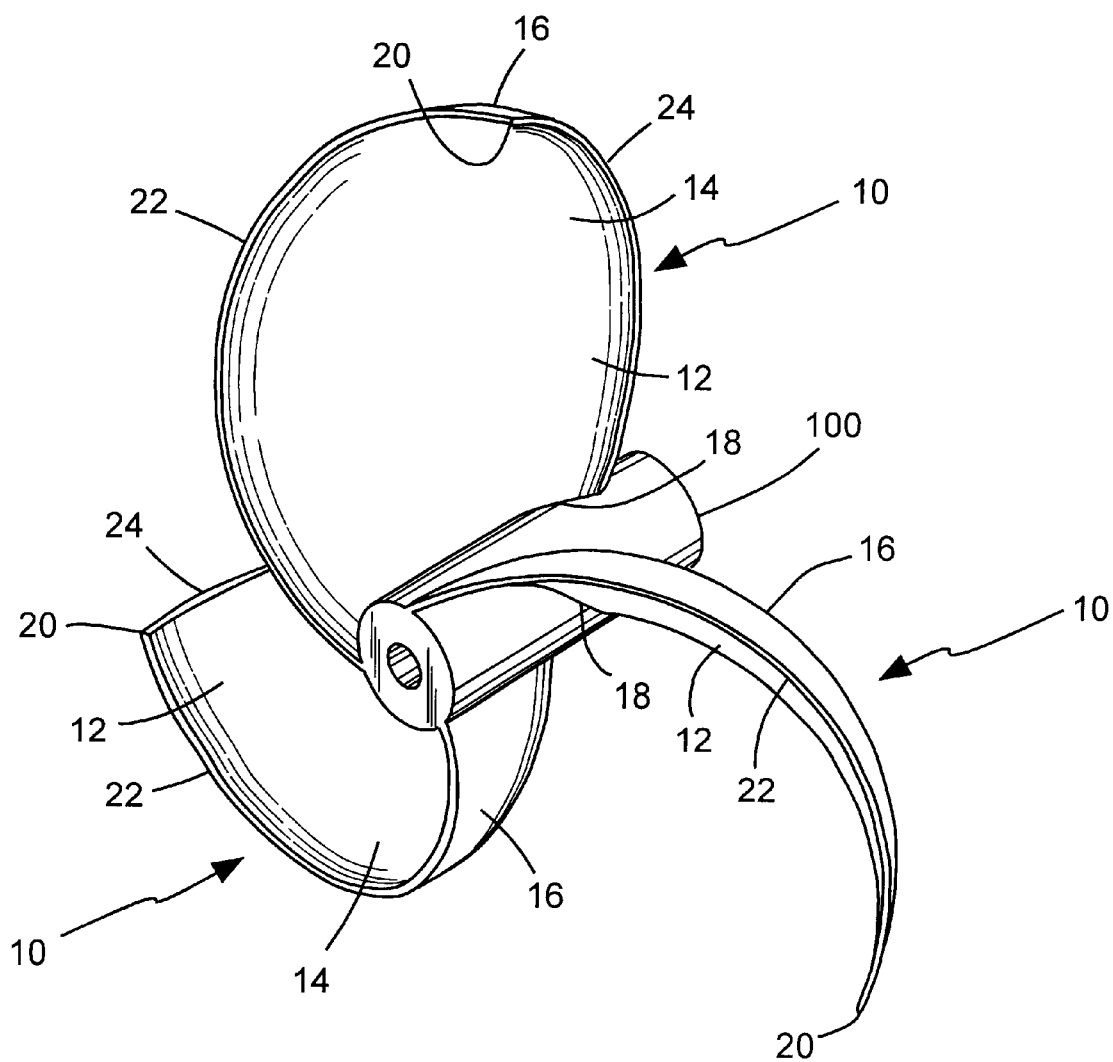
FIG. 1 represents a typical embodiment of vanes in accordance with this invention coupled to a hub.

In accordance with another embodiment of the invention the vane body 12 extends from a hub 100 as typically seen in FIG. 1 of the drawings.

In one extending embodiment the vane 10 may be formed from sheet metal, moulded, casted, extruded, sculpted, spark eroded, turned or otherwise made in one piece with the hub 100 in which case the vane 10 may be integral with the hub.

In another extending embodiment the vane body 12 is mounted in a groove or a slot (not specifically shown in the drawings) complimentary. with the inferior edge 18 of the vane body 12 and integrated with the hub 100 by a bonding process.

The invention extends, in accordance with another aspect of this invention to a vane and a hub assembly 60 comprising a plurality of vanes 10 in accordance with the first aspect of this invention; and a hub 100 to which the plurality of vanes 10 are coupled.

The vanes 10 may be integral or securely fitted to the hub 100.

Typically the vanes and hub assembly 60, may comprise two vanes 10 on a single hub or as many as thirty-six to forty-eight vanes. Various vane and hub assemblies 60 are exemplified in FIG. 3 to 37 of the drawings which should not be considered as limiting the vanes as to number, shape or size in any way and are depicted merely by way of examples without restricting the nature and the scope of this invention.

Figure 5:
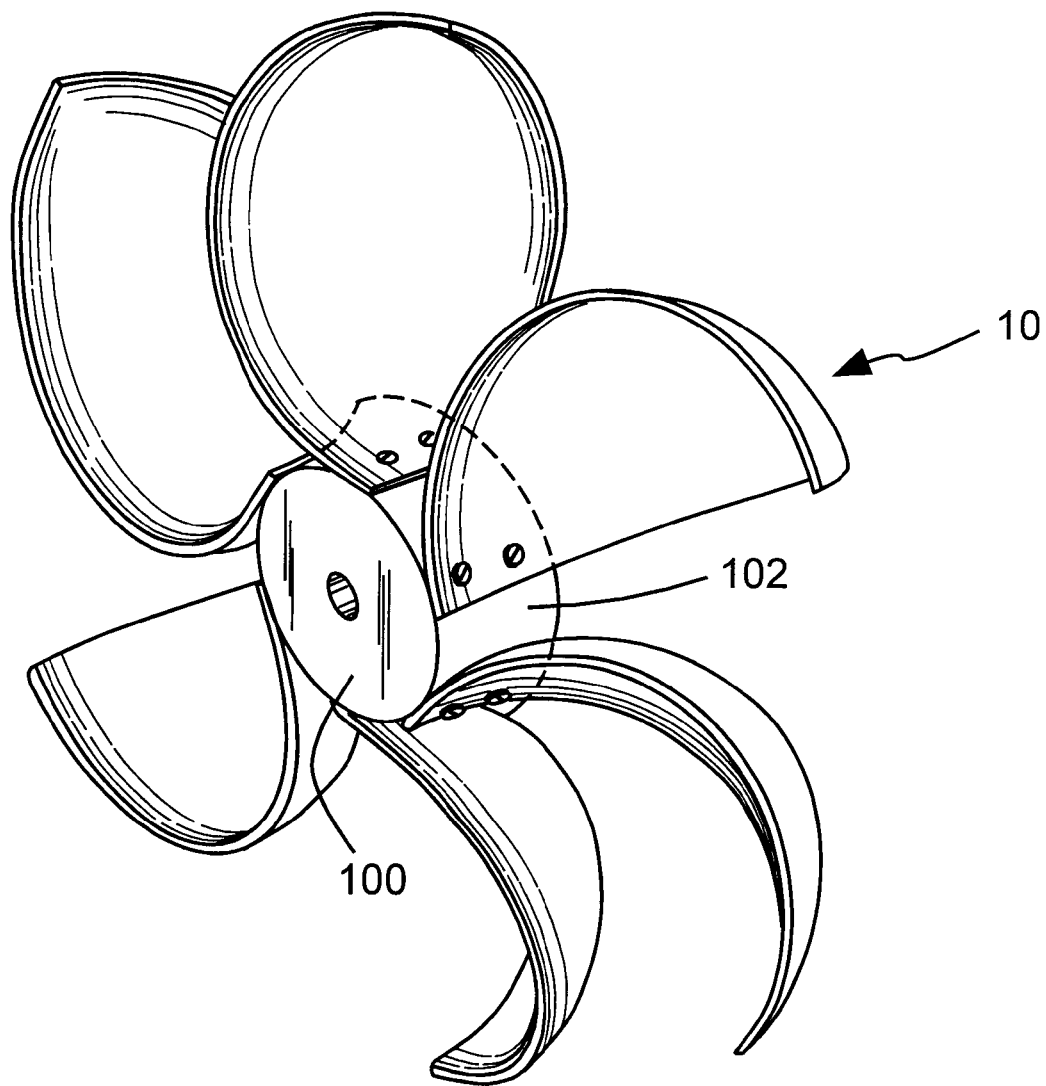
FIG. 5 represents another typical embodiment of 6 vanes in accordance with this invention mounted on a hub, showing the hub surface profiled to complimentarily match the anterior surface of the vanes near the inferior edges of the vanes.
Figure 6:
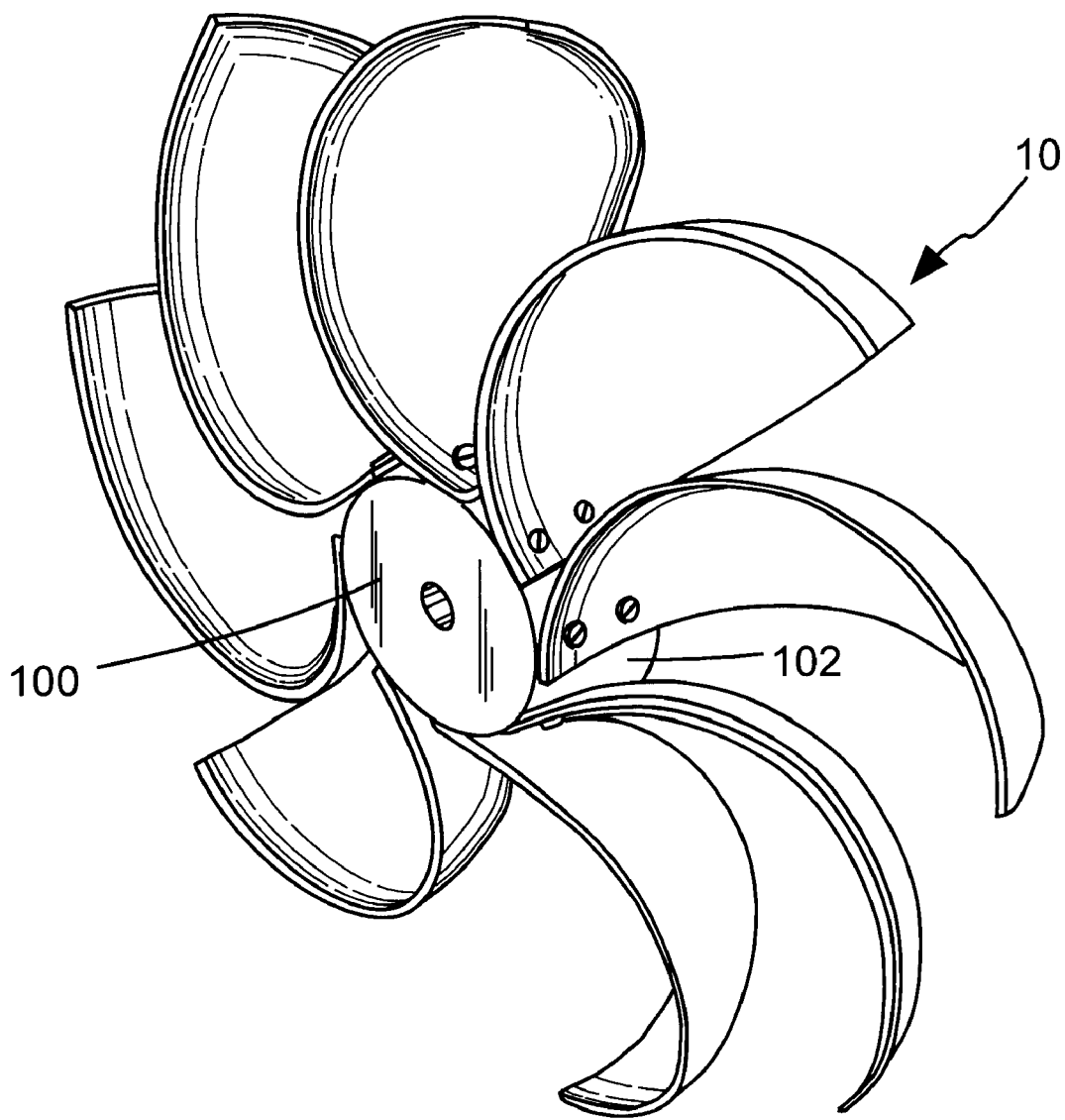
FIG. 6 represents another typical embodiment of 8 vanes in accordance with this invention mounted on a hub.
Figure 7:
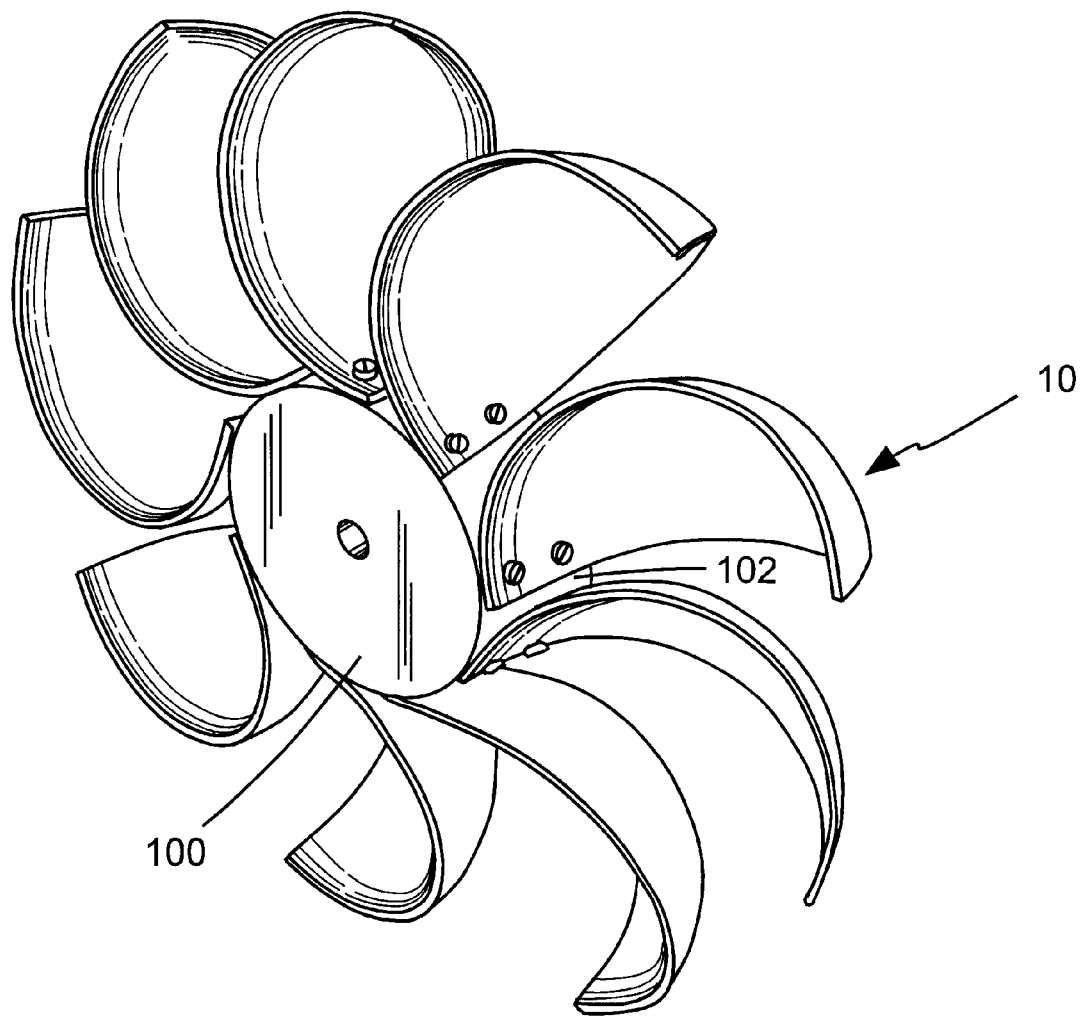
FIG. 7 represents another typical embodiment of 9 vanes in accordance with this invention mounted on a hub.

The hub may be cylindrical or may be profiled (represented by numeral 102) on its outer surface as depicted in FIG. 5 to be complimentary to the surface 16 of the vanes 10 near the inferior edges 18 of the vanes 10.

In the case of securely fitted vane and hub assemblies 60, the hub may be provided with grooves or slots complimentary to the inferior edges 18 of the vane 10. Flanges 28 (complimentary to the inferior edge and/or the posterior surface of the vanes) as particularly seen in FIG. 2 may be provided on the surface of the hub 100 to provide main or additional support to the vanes 10 in its mounted configuration on the hub 100.

The vanes 10 may be positioned relative to the hub 100 so that the axis 130 of the vanes as seen in FIGS. 40 to 42 of the drawings are parallel or inclined to the axis 110 of the hub 100. Further the axis 130 of the vanes may be aligned with or laterally displaced from the vertical plane 120 containing the axis 110 of the hub 100 as particularly seen in FIGS. 38 and 39 of the drawings. Effectively the axis 130 of the vanes 10 may define a plane perpendicular or inclined to the plane containing the axis 110 of the hub 100. Theoretically the inclination of the two axes may be as much as eighty degrees forward or backward, but operationally an inclination between fifteen to sixty degrees may be provided as particularly seen in FIGS. 40A to 40D of the drawings.

The effective centres 132 (as depicted in FIG. 40 to 42 of the drawings) of the hollow spheres of which the surfaces of the vane are sections may define a circle of predetermined radius which may vary depending upon the application of the vane and hub assembly 60. Operatively backward inclination and large radii cause higher velocities of fluid.

The hub diameters may also be varied to suit the application of the device. Varying hub diameters 134 are depicted in FIGS. 42A to 42E of the drawings.

Figure 8:
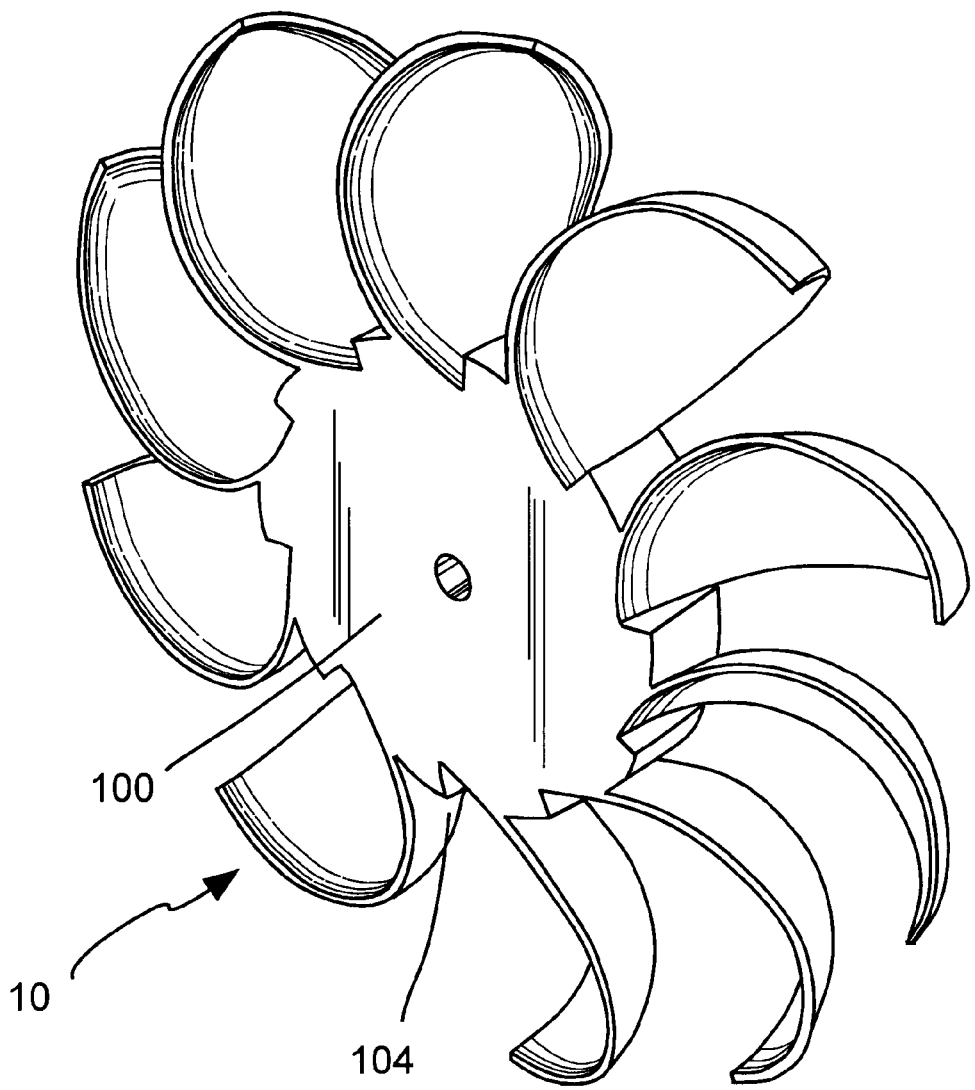
FIG. 8 represents another typical embodiment of 10 vanes in accordance with this invention coupled to a notched hub.
Figure 9:
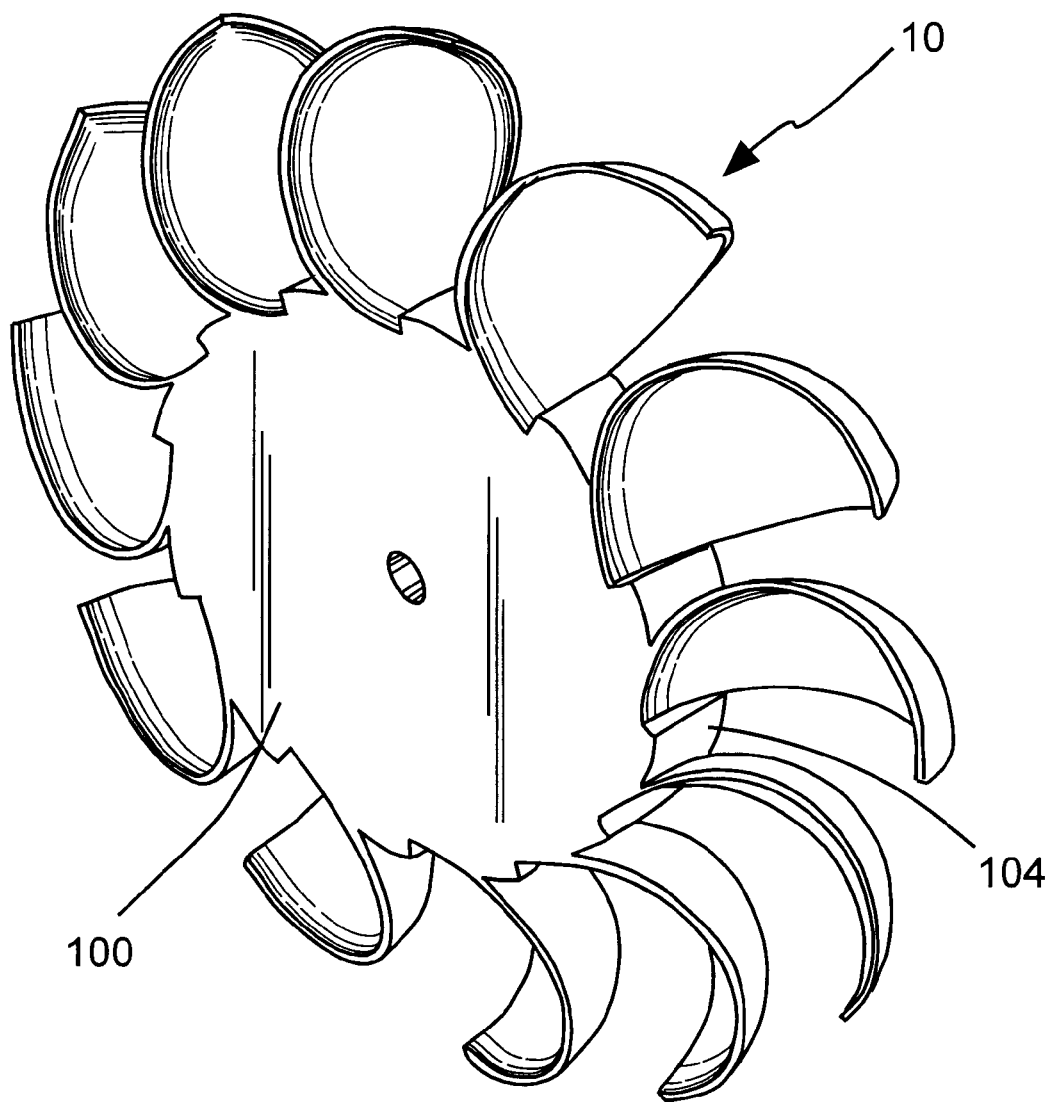
FIG. 9 represents another typical embodiment of 12 vanes in accordance with this invention coupled to a notched hub.
Figure 12:
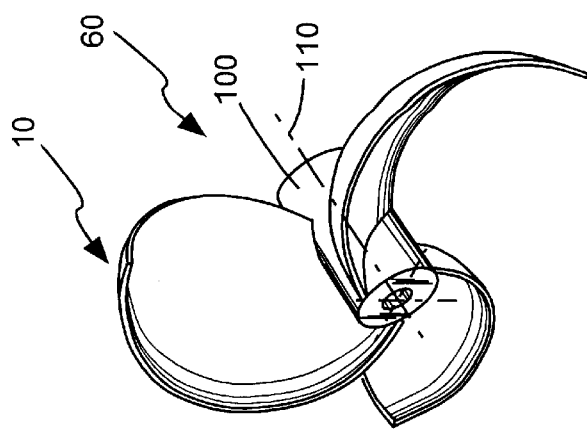
FIGS. 10 to 13 represent respectively the front, right elevation, isometric view and bottom view of a typical vane and hub assembly in accordance with this invention.
Figure 11:
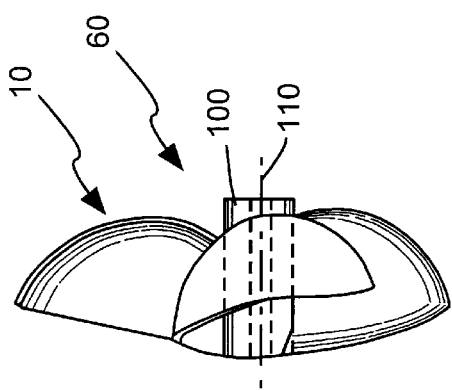
Figure 13:
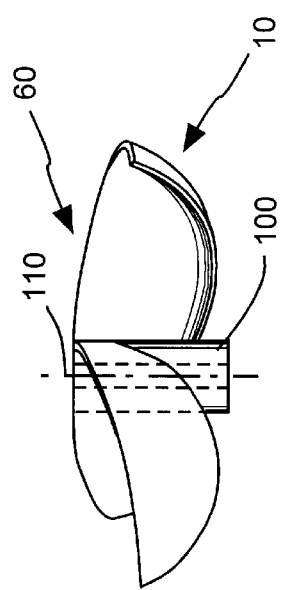
Figure 12A:
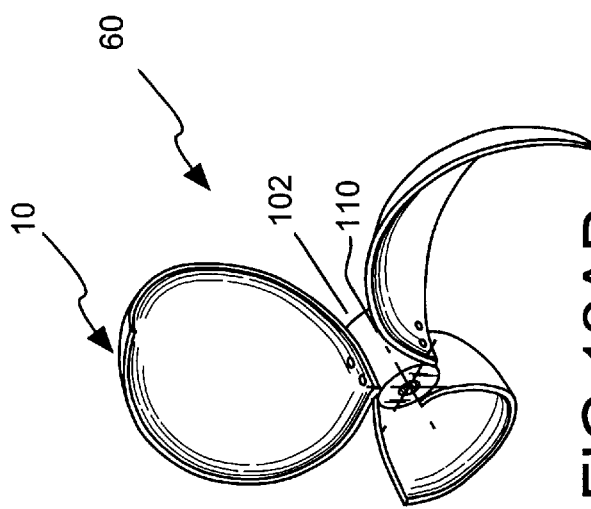
Figure 11A:
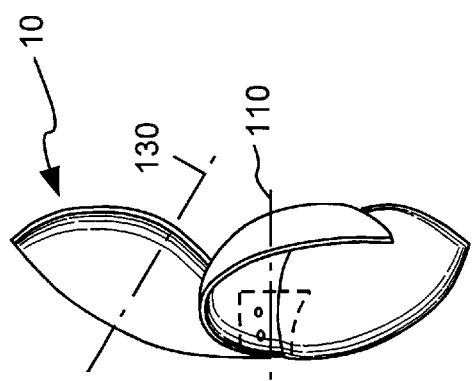
Figure 13A:
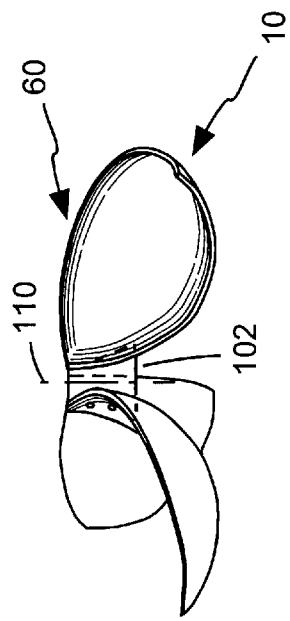

In addition to slots or grooves provided on the hub, the hub may be notched by notches 104 as seen in FIGS. 8 and 9 to improve integration of the vane 10 and the hub 100 and achieve optimum fluid dynamics.

The vanes and the hub may be of fabric, metal, wood, ceramic or of a synthetic polymeric material or a combination of all of the above.

The typical use of the vane and hub assembly as a propeller is seen in FIG. 43 which shows three vanes extending from a hub. In use, when the vane and hub assembly works as a propeller, the angular displacement of the vanes create a low pressure zone at the rear of the vane surface which is the greatest at the vane tip and smallest at the base. As soon as the void is created, fluid rushes (depicted by arrows 135) into the void and is propelled out by the concave surface of the following vane. The resultant propulsion is smoother, more powerful and less energy consuming compared to the conventional axial propellers where the fluid has to be collected and displaced. The vane assembly system in accordance with this invention is capable of providing an efficient performance even against static pressures.

The typical use of the vane and hub assembly as a turbine is seen in FIG. 44 which shows three vanes extending from a hub. When the vane and hub assembly is used as turbine, the fluid impinging on the anterior concave surface of the spherical vanes (all vanes take the full impact of the velocity at a time) is deviated (depicted by the arrows 137) almost through a right angle. Thus the system takes full advantage of fluid velocity. The impact of the fluid causes angular displacement of the vanes creating a low pressure zone along the concave surface of the vanes which causes acceleration of the fluid impinging on the turbine. Furthermore, the deviated fluid is caused to move over the convex posterior spherical surface creating a low fluid pressure. Thus the assembly takes advantage of both the 'push' caused by the fluid velocity on the anterior concave spherical surface of the vanes and the depression caused by the low pressure of the moving fluid at the back on the posterior convex spherical surface of the spherical vanes.

It is easily understood that in the vanes in accordance with this invention and in the operation of the vane and hub assemblies both surfaces of each of the vanes is an operative surface unlike the vanes of the prior art. Again the axis of the hub in the vane and hub assembly is parallel to the direction of the velocity and drift of the fluid.

I claim:

1. AN IMPROVED VANE SYSTEM comprising of two or more vanes being part of a spherical section related to a hub characterised in that;
   an operative concave surface of the said vane being part of a spherical section;
   an operative convex surface of the said vane being part of a spherical section
   and the said vane having
   an operative anterior lateral border with
   an operative posterior lateral border having
   a free superior tip and
   an inferior edge related to the said hub by which the vane is angularly displaced around an axis.

2. The improved vane system of claim 1, in which said concave said convex surfaces of each of the vanes are sections of concentric hollow spheres and said vane body is uniformly thick.

3. The improved vane system of claim 1, wherein said concave and said convex surfaces are sections of non concentric hollow spheres and said vanes are not uniformly thick such that the body of at least one of the vanes is thinner at the free superior tip and thicker at the inferior edge relative to the hub.

4. An improved vane system as claimed in claim 1, wherein the superior tip is defined by the meeting of the operative anterior lateral and the operative posterior lateral borders.

5. An improved vane system as claimed in claim 1, wherein each of the said vane is securely fitted to a hub on which it is angularly displaced.

6. An improved vane system as claimed in claim 1, wherein the inferior edges of the vane body are profiled to contour a hub upon which said hub is bonded.

7. An improved vane system as claimed in claim 1, wherein the said vanes are provided at its inferior edge with apertures through which bolts, screws or other fixture means pass through for securely fitting to the hub.

8. An improved vane system as claimed in claim 1, wherein the said vanes extend from a hub.

9. An improved vane system as claimed in claim 1, wherein the said vanes are made by any one of the following processes consisting of formed from sheet metal, molded, casted, extruded, sculpted, spark eroded, turned made in one piece, with a hub in which case said vane is integral with said hub.

10. An improved vane system as claimed in claim 1, wherein the vane body is mounted in a groove or slot complimentary with the inferior edge of the said vane body and integrated with a hub by a bonding process.

11. An improved vane system as claimed in claim 1, wherein the said vanes are similar in shape and size to each other.

12. An improved vane system as claimed in claim 1, in which the said vanes are integral with a hub.

13. An improved vane system as claimed in claim 1, wherein a hub upon which the vanes are mounted is profiled on its outer surface to be complimentary to the anterior surface of the vanes near the inferior edge of the said vanes.

14. A improved vane system as claimed in claim 1, wherein the vanes are mounted on a hub and flanges are provided on the surface of the hub to provide main or additional support to the said vanes.

15. An improved vane system as claimed in claim 1, wherein the said vanes are positioned relative to a hub so that the axis of the vanes are parallel or inclined to the axis of the hub.

16. An improved vane system as claimed in claim 1, wherein the axis of the said vanes are aligned with or laterally displaced from the vertical plane containing the axis of a said hub.

17. An improved vane system as claimed in claim 1, in which the axis of the said vanes define a plane perpendicular or inclined to the plane containing the axis of a hub.

18. An improved vane system as claimed in claim 1, wherein the effective centres of the hollow spheres of which the surfaces of the said vanes are sections defining a circle of predetermined radius which may vary depending upon the application of the vane and hub assembly.

19. An improved vane system as claimed in claim 1, wherein the said vanes are mounted on a hub, diameter of which may vary to suit a pre-determined application.

20. An improved vane system as claimed in claim 1, in which the said vanes are mounted on a hub in which slots or grooves are provided on the hub and the hub is notched to improve integration of the said vanes and the hub.

21. The improved vane system of claim 1, wherein said vane further includes a support member chosen from the group consisting of a bar, a tube or an angle said support member being securely fixed to said hub at one end and said tip of said vane at the other end to provide additional strength and support.

22. The improved vane system of claim 1, made of at least one of the following materials from the group consisting of fabric, metal, wood, ceramic, a synthetic polymeric material.

23. A vane system comprising:

a hub including a rotational axis; and at least two vanes radially and symmetrically disposed on said hub with respect to said rotational axis, each said vane including a volume defined by opposing concave and convex partial spherical sections less than a hemisphere.

24. The vane system of claim 23, wherein that said vanes are affixed to said hub by welding.

25. The vane system of claim 23, wherein said vanes are affixed to said hub by bolting.

26. The vane system of claim 23, wherein said vanes are affixed to said hub by bonding.

27. The vane system of claim 23, wherein said vanes are affixed to said hub by flanges, said flanges provide support to said vanes.

28. The vane system of claim 23, wherein said vanes are affixed to said hub by slots provided on said hub, said slots adapted receive said vanes.

29. The vane system of claim 23, wherein said vanes are affixed to said hub by screws.

30. The vane system of claim 23, wherein said vanes and said hub are unitarily formed.

* * * * *

UNITED STATES PATENT AND TRADEMARK OFFICE
CERTIFICATE OF CORRECTION

PATENT NO.    : 6,247,897 B1
DATED         : June 19, 2001
INVENTOR(S)   : Dinesh Patel It is certified that error appears in the above-identified patent and that said Letters Patent is hereby corrected as shown below:

Title page,
Item [54], title, replace "VANE SYSTEM" to -- AN IMPROVED VANE SYSTEM. --

Column 2,
Line 14, replace "on" with -- one --.

Column 6,
Line 33, replace "concave said convex…" with -- concave and said convex… --; and Column 7,
Line 10, replace "A improved vane system…" with -- An improved vane system… --.

Signed and Sealed this

Fifteenth Day of April, 2003

JAMES E. ROGAN
*Director of the United States Patent and Trademark Office*